United States Patent
Hurley et al.

(10) Patent No.: US 7,739,800 B2
(45) Date of Patent: Jun. 22, 2010

(54) COMBINATION BLOWER, TRIMMER AND EDGER FOR TENDING VEGETATION

(76) Inventors: Edward P. Hurley, 1214 Western Pine Cir., Sarasota, FL (US) 34240-1424; Steven M. Harrington, 1293 Blue Sky Dr., Cardiff, CA (US) 92007; Douglas Gaylord, 2020 Beryl St., San Diego, CA (US) 92109; Ryan R. Butrym, 2581 Montgomery Ave., Cardiff by the Sea, CA (US) 92007; Bruce K. Bridges, 766 Ocean Crest, Cardiff by the Sea, CA (US) 92007

( * ) Notice: Subject to any disclaimer, the term of this patent is extended or adjusted under 35 U.S.C. 154(b) by 791 days.

(21) Appl. No.: 11/585,707

(22) Filed: Oct. 24, 2006

(65) Prior Publication Data

US 2008/0092398 A1    Apr. 24, 2008

(51) Int. Cl.
*A01D 34/46* (2006.01)
*A01D 34/67* (2006.01)

(52) U.S. Cl. .............. 30/276; 30/122; 172/14
(58) Field of Classification Search ............ 30/122, 30/276; 56/12.7; 172/14
See application file for complete search history.

(56) References Cited

U.S. PATENT DOCUMENTS

| | | | |
|---|---|---|---|
| 3,831,278 A | 8/1974 | Voglesonger | |
| 4,168,572 A | 9/1979 | Ewing | |
| 4,187,577 A | 2/1980 | Hanson et al. | |
| 4,189,833 A | 2/1980 | Kwater | |
| 4,282,652 A | 8/1981 | Ballas, Sr. | |
| 4,364,435 A | 12/1982 | Tuggle et al. | |
| 4,483,069 A | 11/1984 | Moore | |
| 4,505,040 A * | 3/1985 | Everts | 30/296.1 |
| 4,733,471 A | 3/1988 | Rahe | |
| 4,835,950 A | 6/1989 | Cerreta | |
| 4,841,929 A * | 6/1989 | Tuggle et al. | 123/198 E |
| 5,261,162 A * | 11/1993 | Siegler | 30/216 |
| 5,661,960 A | 9/1997 | Smith et al. | |
| 5,662,428 A * | 9/1997 | Wilson | 403/374.5 |
| 5,740,613 A | 4/1998 | Swistun et al. | |

(Continued)

*Primary Examiner*—Hwei-Siu C Payer
(74) *Attorney, Agent, or Firm*—Maxey Law Offices, PLLC; Stephen Lewellyn; Brittany Maxey

(57) ABSTRACT

An engine is connected to the upper end of a drive shaft housing and a work head with a string trimmer or blower or both is operatively connected to the lower end of the drive shaft housing and is rotatably driven by an engine rotating a drive shaft inside the drive shaft housing and connected to the working head. The drive shaft housing is rigidly connected to the working head and may be rotated about its longitudinal axis relative to the engine in any desired amount of rotation, but the preferred degree of rotation is 135° to move the working head from a trimming position with the rotating trimmer string in a horizontal position to an edging position with the rotating trimmer string in a vertical position and with the working head being displaced to the operator's right side for better viewing and control and operator comfort. In one embodiment, a gear driven crank handle is rigidly connected to the drive shaft housing and is itself rotated 135° as the drive shaft housing is rotated 135° to place the handle in a position that is comfortable to use. Further, the amount of air flowing through the blower is regulated by an air outlet regulating valve and a separate air intake regulating valve.

10 Claims, 19 Drawing Sheets

U.S. PATENT DOCUMENTS

| | | |
|---|---|---|
| 5,970,692 A | 10/1999 | Foster |
| 6,327,781 B1 | 12/2001 | Sinclair et al. |
| 6,336,254 B1 | 1/2002 | Graff et al. |
| 6,415,585 B2 | 7/2002 | Morabit et al. |
| 6,439,088 B1 | 8/2002 | Eytchison et al. |
| 6,442,845 B2 | 9/2002 | Wheeler et al. |
| 6,460,253 B1 | 10/2002 | Wheeler et al. |
| 6,460,670 B2 | 10/2002 | Schaedler ................. 192/18 A |
| 6,474,747 B2 | 11/2002 | Beaulieu et al. .......... 301/296.1 |
| 6,594,907 B2 | 7/2003 | Wilson et al. |
| 6,701,623 B2 | 3/2004 | Sanders |
| 6,722,041 B2 * | 4/2004 | Warashina et al. ............ 30/276 |
| 6,742,222 B2 | 6/2004 | Furr-Britt et al. |
| 6,769,494 B2 | 8/2004 | Breneman et al. ............. 172/14 |
| 6,997,633 B2 | 2/2006 | Thomas et al. .............. 403/109 |
| 7,314,096 B2 * | 1/2008 | Shaffer et al. ............... 172/372 |
| 2001/0027610 A1 | 10/2001 | Wheeler et al. |
| 2002/0007559 A1 | 1/2002 | Morabit et al. |
| 2003/0126749 A1 | 7/2003 | Sanders |
| 2004/0154127 A1 | 8/2004 | Sing et al. ..................... 15/405 |
| 2006/0123635 A1 | 6/2006 | Hurley et al. ................. 30/272 |

* cited by examiner

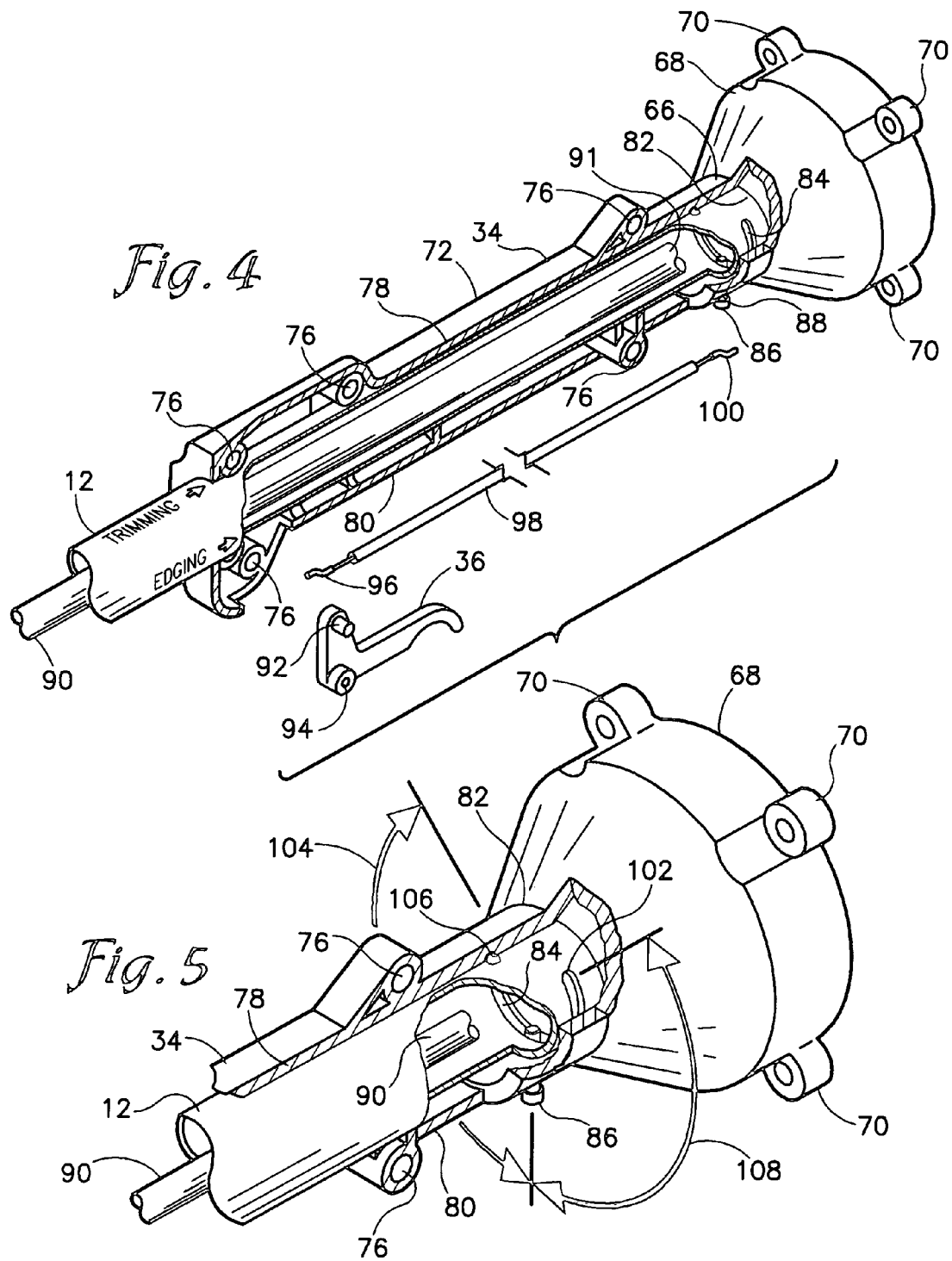

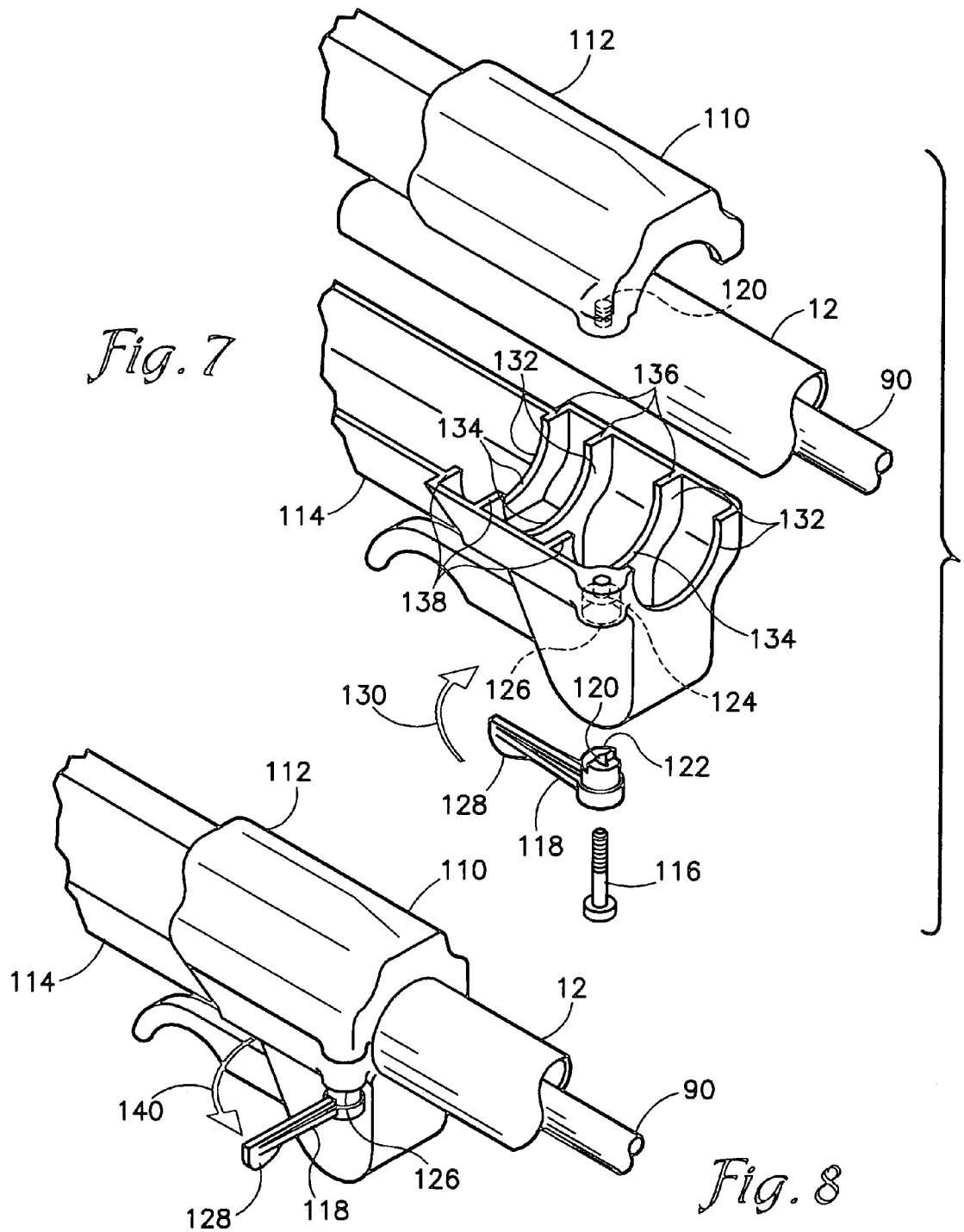

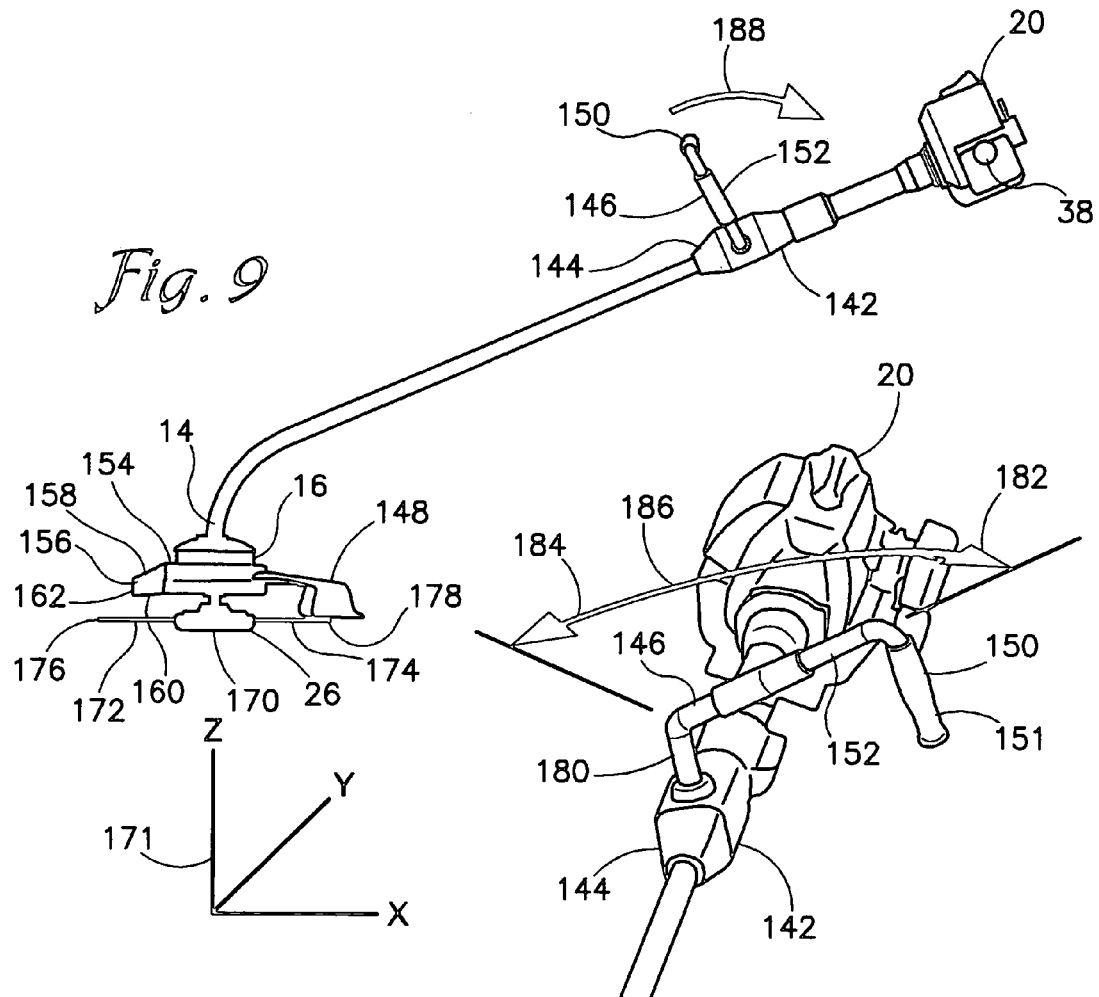
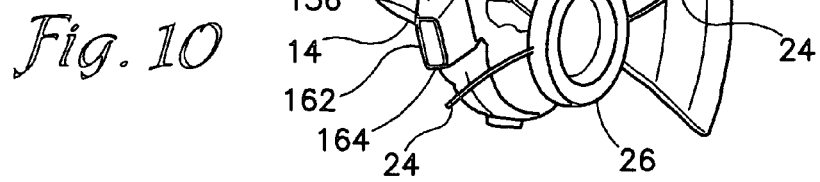

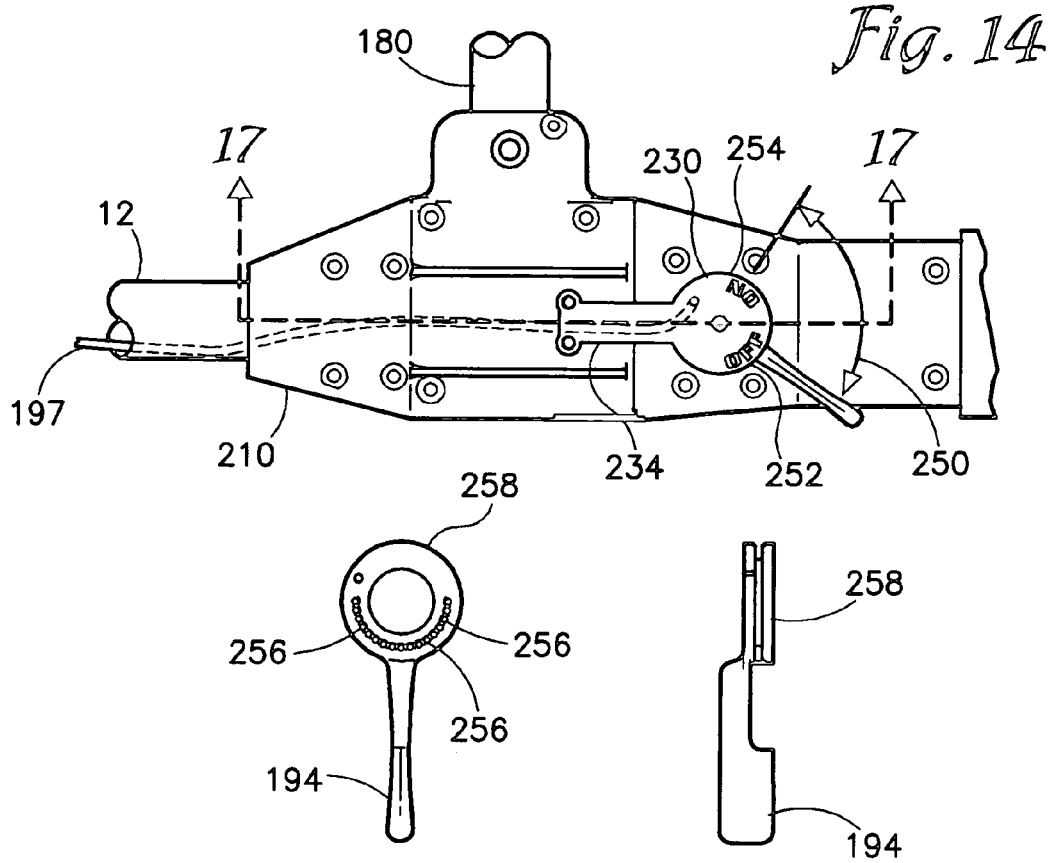
Fig. 14
Fig. 15
Fig. 16
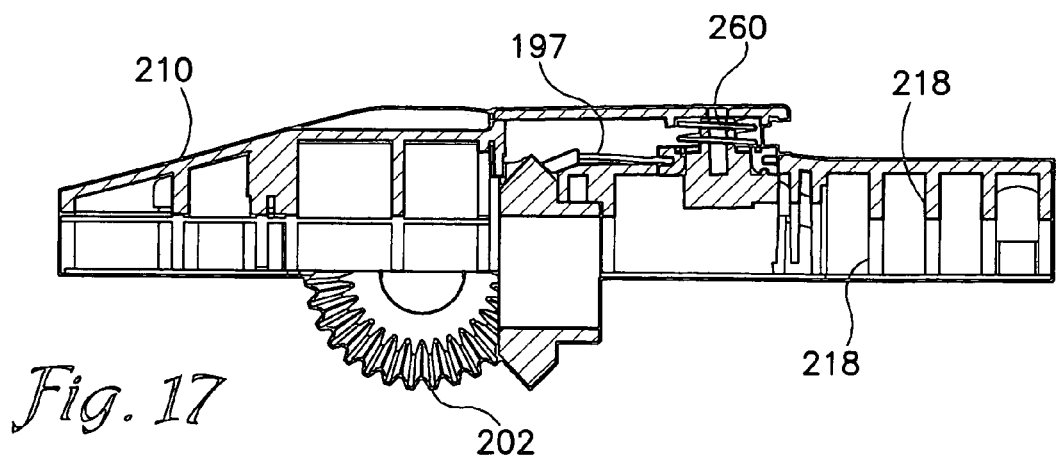
Fig. 17

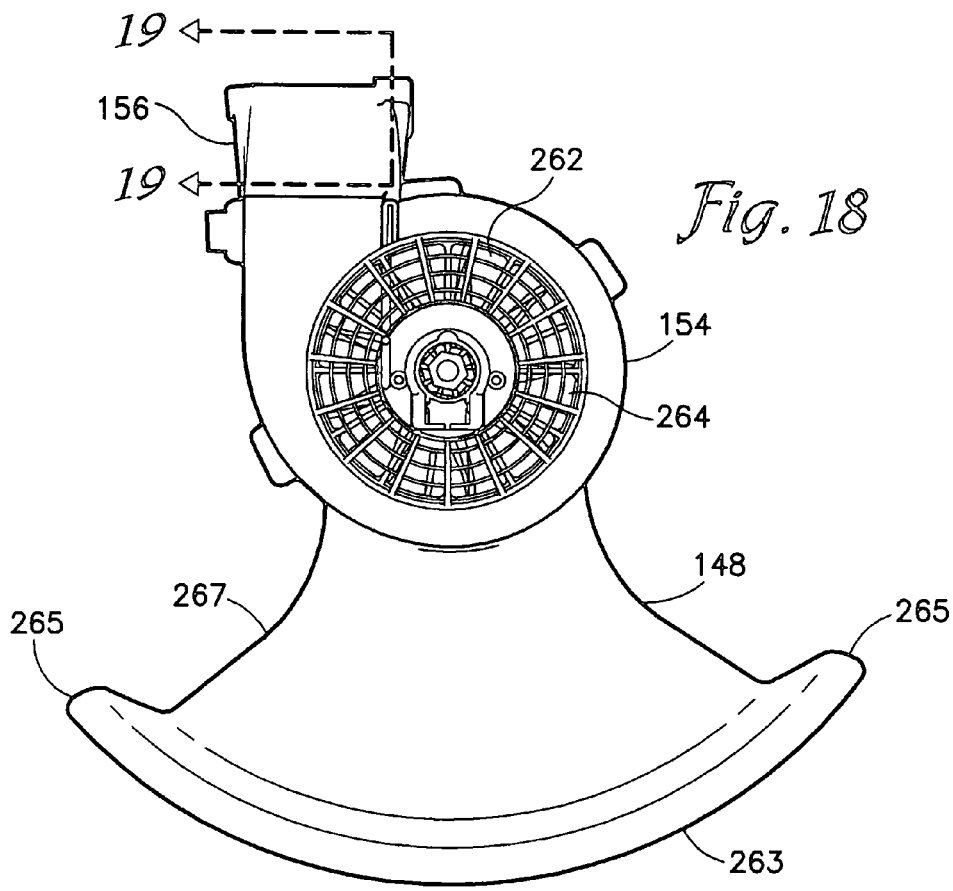

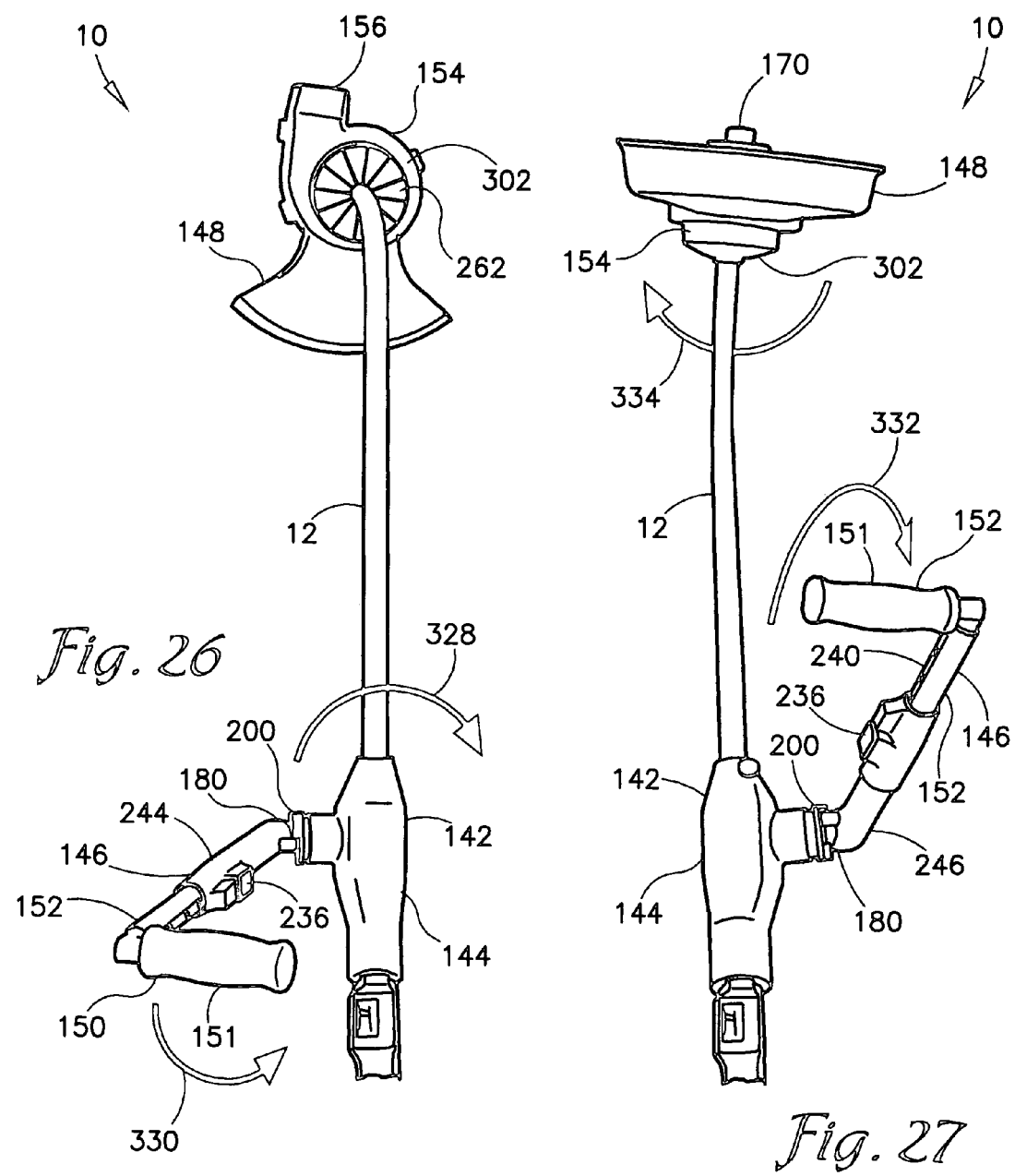

COMBINATION BLOWER, TRIMMER AND EDGER FOR TENDING VEGETATION

CROSS-REFERENCE TO RELATED APPLICATIONS

Not Applicable.

STATEMENT REGARDING FEDERALLY SPONSORED RESEARCH OR DEVELOPMENT

Not applicable.

STATEMENT REGARDING A SEQUENCE LISTING

Not applicable.

BACKGROUND OF THE INVENTION

The present invention is related to an apparatus for facilitating lawn trimming care. More particularly, the present invention combines a blower inside a housing having an exit blower duct and a string trimmer head, both driven simultaneously by a motor connected to a drive shaft. Novel handles facilitate rotating the apparatus into a trimming mode or an edging mode and air flow control valves regulate the volume of air flowing through the blower.

DESCRIPTION OF THE RELATED ART INCLUDING INFORMATION DISCLOSED UNDER 37 C.F.R. 1.97 AND 1.98

Complete lawn care now typically includes trimming areas that lawn mowers cannot access easily; edging vegetation along defined perimeters, such as curbs; and removing the vegetation debris, such as lawn trimmings or fallen leaves, from areas where they are not wanted, such as sidewalks and driveways, typically by blowing them away to an area where they will not be seen, such as the lawn. Carrying out these separate tasks has traditionally required different and separate tools, namely, a lawn mower, a string trimmer, an edger and a blower.

In commercial applications particularly, such as grooming golf courses, the necessity for using different and separate tools for these tasks leads to lost time and inefficiency because workers must return to a tool shed or truck, often located at some distance from the workers, to retrieve the appropriate tool. A worker may carry and use a particular tool, for example, a string trimmer, for several hours without pause, leading him far from his tool shed or truck. The worker cannot carry all these different tools with him due to their bulk and weight.

Further, many workers remove the debris shield from string trimmers to provide a better view of the work area, but the debris shield is designed to help prevent flying debris from striking the worker in the eyes or other sensitive areas.

Combining the functionality of some of these separate tools into a single tool would save time and money, including capital outlay for the tools.

Further, when a conventional string trimmer is used for edging, the user typically twists his body into an unnatural, uncomfortable and dangerous posture and usually walks backward to accomplish edging, in which the trimmer is held so that the rotating trimming string rotates basically in a vertical plane. It would be safer to provide a string trimmer that can be rotated into a natural position that allows the trimmer string to rotate in a vertical plane.

Some efforts in that direction have been taken. For example, U.S. Pat. No. 4,773,471 discloses separate operating heads, such as a string trimmer head or a blower head, that can be attached and detached from the same power plant and drive train, saving the expense of a second motor. This system still requires that a significant subassembly of the tool be removed and replaced by another tool, requiring the worker to carry separate tools and to change operating heads on the tool. This system has the same disadvantages as having separate tools when they are used.

U.S. Pat. No. 4,187,577 discloses a blower chute that can be strapped onto the bottom of a string trimmer with a bungee cord, but does not allow the string trimmer function to be used when the blower attachment is installed, requiring the operator to carry separate subsystems and install and remove them to carry out the separate functions of trimming and blowing.

U.S. Patent Application Publication Number US 2002/0007559 discloses a string trimmer with a specially designed shroud that is supposed to help the rotating string of the string trimmer to function as a blower. While it has long been known that the rotating string of the string trimmer provides some blowing forces, they tend to be non-directional, producing greater drag on the engine than a small blower would, and even this reference discloses that any blowing action is basically downward and outward from the rotating string, which provides little benefit in debris removal from sidewalks and so forth. Further, any blowing force generated by the rotating string is minimal and will not move debris any significant distance.

U.S. Pat. No. 6,442,845 discloses a string trimmer that can be converted to a blade trimmer and that can be modified to attach a blower flute or scroll to direct air flow generated by a cooling fin that is part of the string trimmer spool and designed to cool the motor of the apparatus. The use of this fan in a attempt to create a blower function is inadequate because it utilizes a fan that is designed only for motor cooling and is structurally a part of a string trimmer head, limiting its utility for actually blowing debris, due to its position and its use to cool the motor. A string trimmer head that does not include a cooling fan could apparently not be used with this device. In addition, reversible cutting blades pose a greater threat of injury to the operator than a softer material, such as a trimming string.

Further, many lawn equipment operators use a string trimmer for basic edging by rotating the handle of the string trimmer so that the string rotates in a generally vertical plane and the end of the string strikes the ground adjacent to a sidewalk or the like. To use a string trimmer in this manner is typically a very awkward operation that places the motor close to the operator's head and requires a back bending contortions that are uncomfortable and may be unsafe. When a conventional string trimmer is turned 90° more-or-less to present the rotating trimming string in a roughly vertical plane, the engine naturally rotates along with the drive shaft and the trimmer head, often moving the piston lower than the crankcase, allowing excess oil to enter the combustion chamber, thereby increasing pollution and denying sufficient lubrication to the piston rod and crankshaft, and this rotation frequently places the muffler adjacent to the operator's head, which can cause hearing loss and burns. A string trimmer or the like that could easily be adjusted to allow comfortable use with the rotating string in a vertical plane would be a welcome improvement, especially if it could maintain the motor or engine in its normal upright position, but none appears to be available, as would a lawn care apparatus that can be easily adjusted for convenient use by either a right-handed or a left-handed operator. Further, in some applications, it may be desirable not to have the blower operating, which would increase the engine power available to drive the trimmer string, or to be able to regulate the volume of air expelled by the blower, independently of the engine throttle or engine speed.

Utilizing a string trimmer for trimming vegetation, typically grass, adjacent to curbs, sidewalks, driveways and so forth has become common. Operators typically rotate the tool in some attitude designed to turn the rotating string into a basically vertical plane so that only vegetation immediately adjacent to the non-vegetation surface is cut. In using the string trimmer as an edger, the usual goal is to cut the offending vegetation at the ground, eliminating grass overhang onto the non-vegetation surface. Twisting a conventional tool to move the rotating string into a vertical plane leaves the operator contorted into an unnaturally bend posture, typically with the engine immediately adjacent to his head, where noise and air pollution are a problem, and the operator is typically forced to walk backward if he is to see his work, creating a danger of being hit by passing motor vehicles that he can neither see nor hear. The electric motor or gasoline engine also rotates because it is rigidly connected to the drive shaft housing. In the case of a gasoline engine string trimmer, rotating the engine can result in crankcase oil finding its way into the combustion chamber, causing the engine to bog down or stall and shortening the life of the sparkplug and the engine.

Some string trimmers now have a split boom, or drive shaft housing, that allows the lower end portion, with the string trimmer attached, to be removed from the upper boom portion, rotated 90° and then reinserted into the upper boom portion, thus rotating the string trimmer into a more or less vertical plane. In order to keep the string trimmer in a vertical plane, however, the operator must still contort his body into an unnatural and uncomfortable position and typically must walk backward in order to see his work.

This outcome when using a conventional string trimmer as an edger results from the industry's misunderstanding the problem it is addressing. The industry perceives that the problem is rotating the trimmer string plane in two-dimensional xz space, that is, moving a horizontal plane into a vertical plane, that is, a simple 90° rotation clockwise for a right-handed operator or counterclockwise for a left-handed operator.

In reality, the rotation must be considered in three-dimensional xyz space because the entire lawn care apparatus is being rotated, not simply the working head and so the orientation of the drive shaft housing and handles changes when the cutting head and rotating string are rotated. If the operator is to comfortably convert the trimmer for edging with the trimmer string rotating in a vertical plane, the drive shaft housing must also be rotated in a fashion that will allows the operator to use a comfortable and safer posture while edging. The cutting path of the trimming string is the plane in which the trimming string rotates during use and is typically either a basically horizontal path when the apparatus is used for trimming turf or a basically vertical plane or path when used for edging, in contrast to the walking path, which is the route or manner of walking, such as forward or backward, that the operator takes during lawn grooming operations, either trimming or edging. It is also highly desirable to edge along curbs, sidewalks and the like while moving toward the interior of the lawn for lawn trimming chores and then returning over the areas that have been edged to blow debris back onto the lawn.

Therefore, there is a need for a single lawn care apparatus that can be used as string trimmer, blower and edger; that will perform these functions as well as traditional separate tools; that provides superior trimming as a result of the simultaneous blower function; that can use a variety of conventional string trimmer heads; that can be easily adjusted to allow the operator to comfortably operate the trimming string in a vertical plane without changing the operator's posture or position through manipulation of a handle that facilitates comfortable and safe operation of the string trimmer as an edger and that keeps the motor upright; that allows the volume of air expelled from the blower to be controlled and adjusted independently of the engine speed; and that can easily be adjusted for left-handed or right-handed operators.

BRIEF SUMMARY OF THE INVENTION

Accordingly, it is a primary object of the present invention to provide a single lawn care apparatus that can be used as string trimmer, blower and edger.

It is another object of the present invention to provide a single lawn care apparatus that will perform these functions as well as traditional separate tools.

It is another object of the present invention to provide a single lawn care apparatus that provides superior trimming as a result of the simultaneous blower function.

It is another object of the present invention to provide a single lawn care apparatus that can use either an internal combustion engine or an electric motor as a power source.

It is another object of the present invention to provide a single lawn care apparatus that can use a variety of conventional string trimmer heads.

It is another object of the present invention to provide a single lawn care apparatus that can be easily adjusted to allow the operator to operate the trimming string in a vertical plane without changing the operator's posture or position through manipulation of a handle that facilitates comfortable and safe operation of the string trimmer as an edger and that it keeps the motor upright.

It is another object of the present invention to provide a single lawn care apparatus that allows the volume of air expelled from the blower to be controlled and adjusted independently of the engine speed.

It is another object of the present invention to provide a single lawn care apparatus that can easily be adjusted for left-handed or right-handed operators.

To achieve these objects, the present invention includes an impeller seated in a plenum, preferably a ring plenum, connected to duct work for blowing, and a string trimmer head, both connected to a gasoline engine or an electric motor, or other suitable power source, either corded or battery operated, through a drive shaft for simultaneous rotation in the same direction. The blower outlet includes an oval or round shaped outlet nozzle for concentrating and directing the flow of air from the blower. The rotating string trimmer creates some draft and the air flow from the blower creates low air pressure above the rotating string, maintaining the string along a straighter line and a higher line that would be the case without the blower's operating and lifting the vegetation to be trimmed, allowing for more even height of the resulting trimmed vegetation.

A handle is fixed to the drive shaft housing and allows the operator to move the handle into a variety of different positions that allow the operator to use the apparatus with the rotating string of the string trimmer rotating either a horizontal or vertical plane without changing his posture or position. The drive shaft housing tube rotates in its mount adjacent to the engine, while the handle remains fixed to the drive shaft housing tube and does not rotate independently of the drive shaft housing tube. The adjustable handle also allows adjustment of the handle so that the apparatus to be used by either right-handed or left-handed operator using the same posture.

Other objects and advantages of the present invention will become apparent from the following description taken in connection with the accompanying drawings, wherein is set forth by way of illustration and example, the preferred embodiment of the present invention and the best mode currently known to the inventors for carrying out their invention.

BRIEF DESCRIPTION OF THE SEVERAL VIEWS OF THE DRAWING

FIG. 4 is an isometric view of a handle assembly adjacent to the engine and partially cut away to reveal the drive shaft rotation mechanism.

FIG. 5 is an enlarged fragmentary isometric view of the proximal portion of the handle assembly of FIG. 4.

FIG. 7 an exploded fragmentary isometric view of the distal end portion of the handle assembly of FIG. 4.

FIG. 8 is a fragmentary isometric view of the distal end portion of the handle assembly of FIG. 4 as shown in FIG. 7 shown assembled.

FIG. 9 is a side view of the lawn care apparatus of FIG. 1 that utilizes an alternative embodiment of a handle for rotating the drive shaft housing independently of the engine of the lawn care apparatus.

FIG. 10 is an isometric lower end view of a lawn care apparatus according to the present invention and alternative handle embodiment of FIG. 9 illustrating the rotation of the alternative embodiment handle of FIG. 9.

FIG. 14 is a bottom view of the housing of the alternative embodiment handle of FIG. 9.

FIG. 15 is a front view of an air shut-off control lever handle for controlling the air flow through the blower of the lawn care apparatus of FIG. 1 by means of a cable running through the drive shaft housing.

FIG. 16 is a side view of the air shut-off control lever handle of FIG. 15.

FIG. 17 is a cross sectional view taken along lines 17-17 of FIG. 14 showing the arrangement of the gears inside the gear housing of the alternative embodiment handle of FIG. 9.

FIG. 18 is a top view of the blower and trimmer working head of the lawn care apparatus of FIG. 1.

FIG. 19 is a cross section taken along lines 19-19 of FIG. 18 showing the butterfly air flow cut-off valve in the outlet duct of the blower of the lawn care apparatus of FIG. 1.

FIG. 20 is a fragmentary isometric view of the blower and blower air outlet duct showing the butterfly air cut-off valve in the outlet duct of the blower in the closed position, shutting off the flow of air and partially cut away to reveal the blower inside the blower housing.

FIG. 26 is a user's top view of a lawn care apparatus according to FIG. 1 having the alternative embodiment handle of FIG. 9 illustrating the position of the handle when the lawn care apparatus is used for trimming by a right-handed operator, that is, with the trimming string rotating in a basically horizontal plane when used in a right-handed user position being manipulated into a position suitable for use by a left-handed operator.

FIG. 27 is a user's top view of a lawn care apparatus according to FIG. 1 having the alternative embodiment handle of FIG. 9 illustrating the position of the handle when the lawn care apparatus is used for edging, that is, with the trimming string rotating in a basically vertical plane when used in a left-handed user position.

Figure 30:
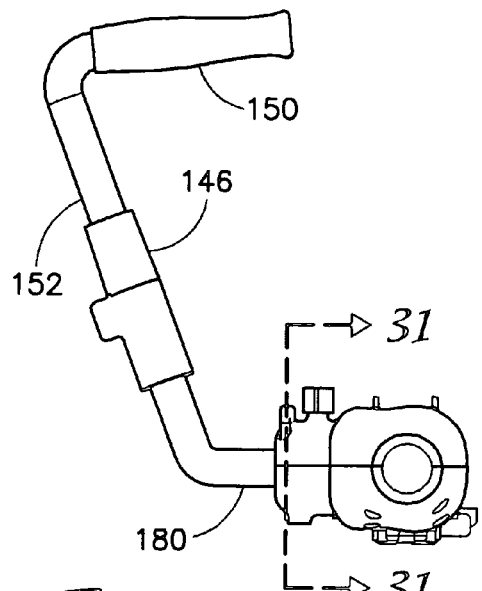
FIG. 30 is a stylized front view of the gear-driven crank handle rotation system of FIGS. 11-13 utilizing an alternative embodiment of the rotation stop system best seen in FIG. 29 showing the gear-driven crank handle rotation system of FIGS. 11-13 of the lawn care apparatus of FIG. 9 locked into position for trimming for a right-handed user.
Figure 31:
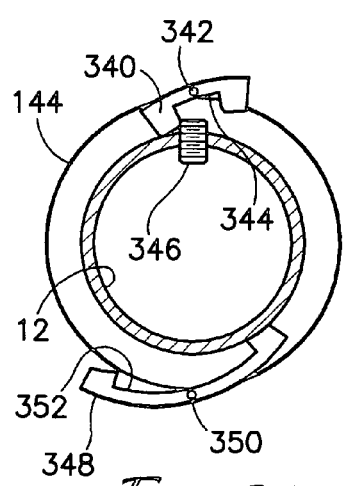

FIG. 31 is a cross section taken along lines 31-31 of FIG. 30.

Figure 11:
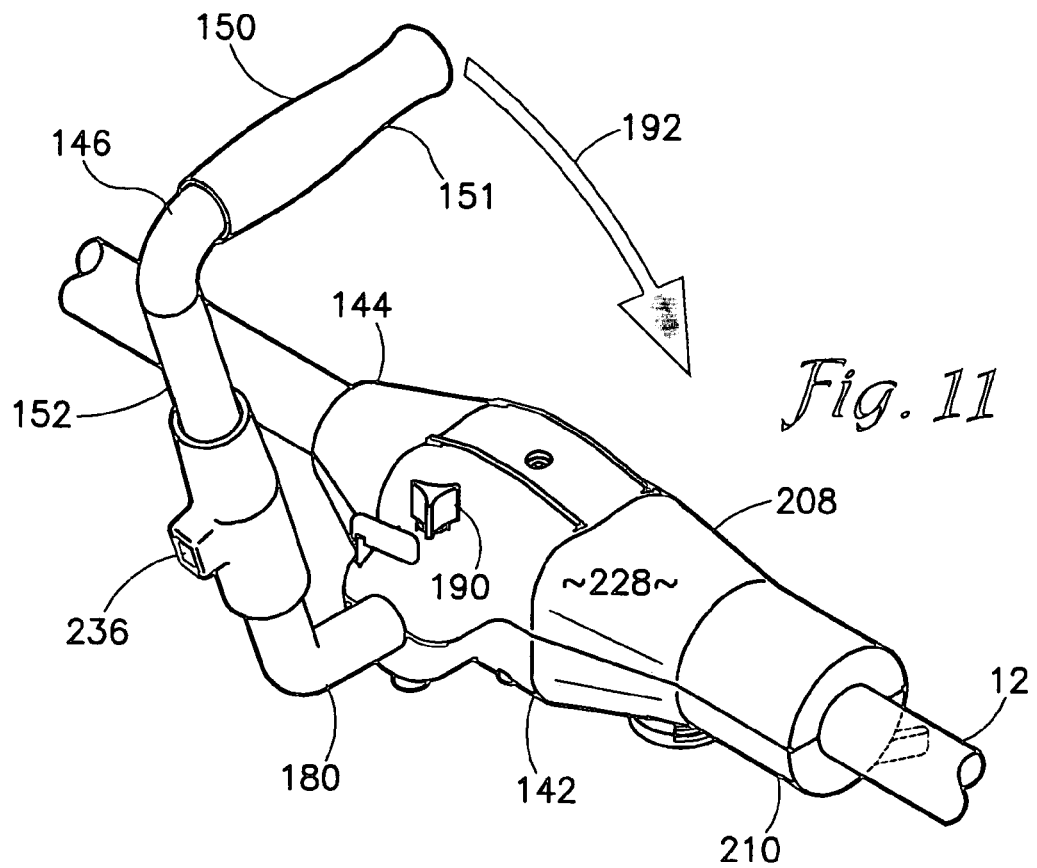
FIG. 11 is an isometric view of the alternative embodiment handle of FIG. 9 shown in the position the handle is in during trimming, that is, with the trimmer string rotating in a basically horizontal plane.
Figure 12:
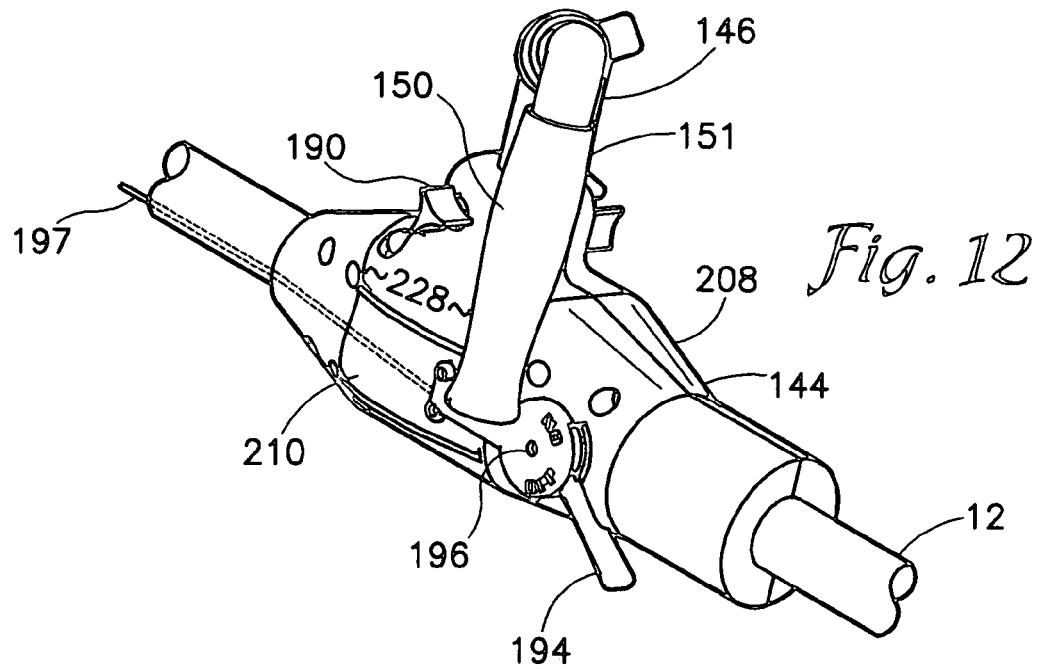
FIG. 12 is an isometric view of the alternative embodiment handle of FIG. 9 shown in the position the alternative embodiment handle is in during edging, that is, with the trimming string rotating in a basically vertical plane.
Figure 13:
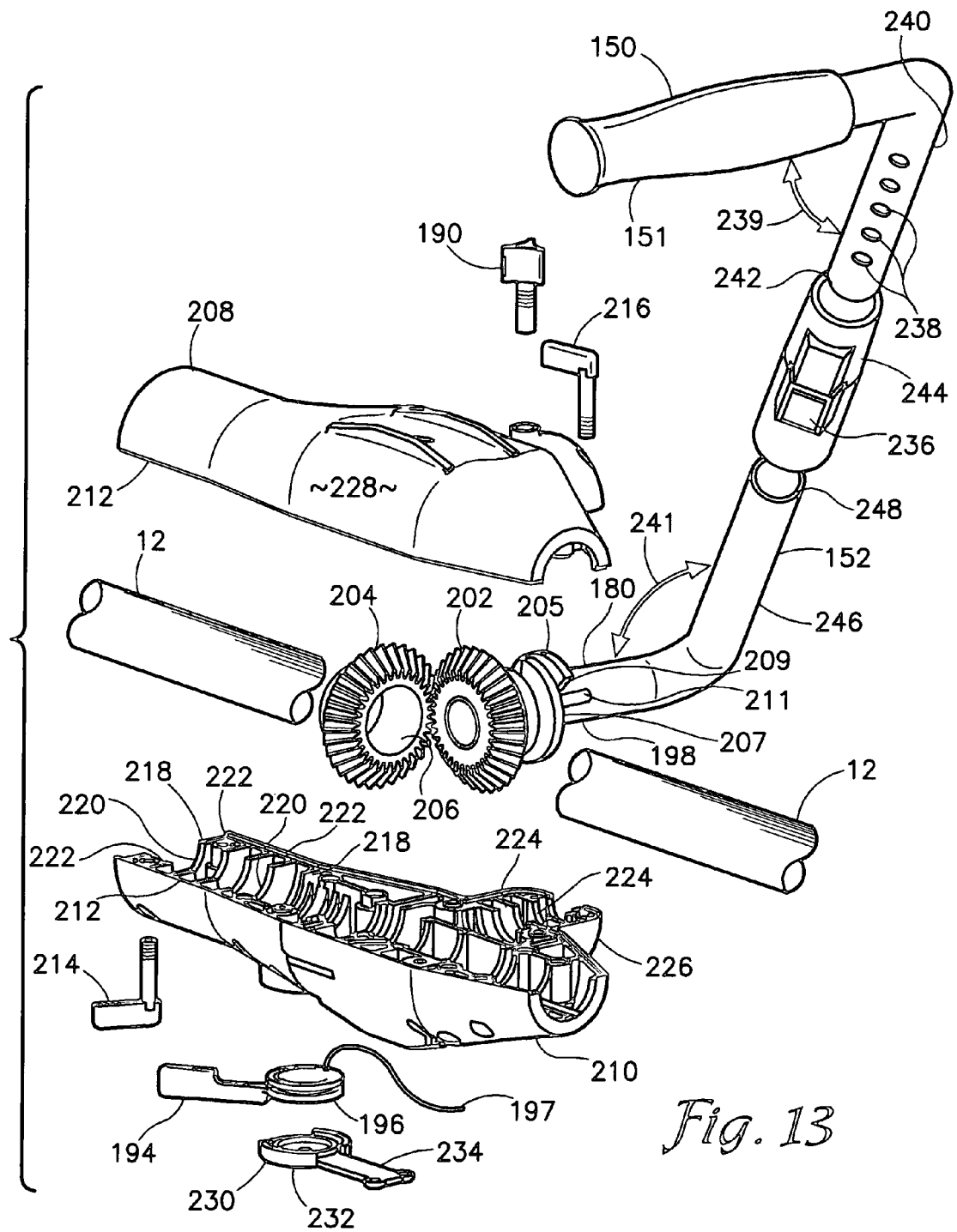
FIG. 13 is an exploded isometric view of the alternative embodiment handle of FIG. 9.
Figure 29:
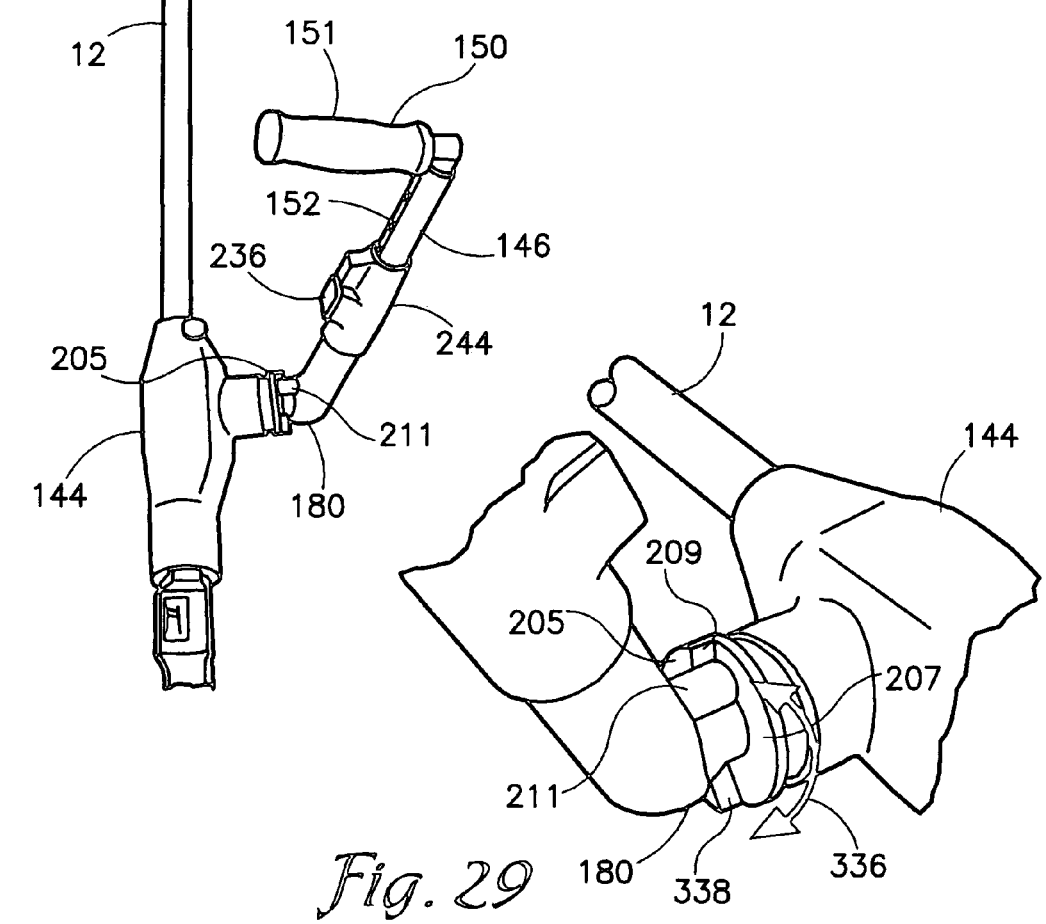
FIG. 29 is an enlarged fragmentary view of the handle of FIG. 9 connected to the gear box housing of the handle of FIG. 9 illustrating one embodiment of a stop mechanism for controlling rotation of the handle.
Figure 32:
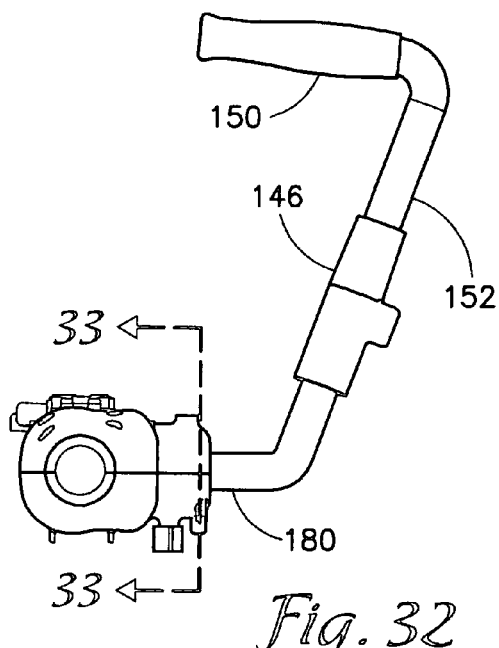

FIG. 32 is a stylized front view of the gear-driven crank handle rotation system of FIGS. 11-13 utilizing an alternative embodiment of the rotation stop system best seen in FIG. 29 showing the gear-driven crank handle rotation system of FIGS. 11-13 of the lawn care apparatus of FIG. 9 locked into position for trimming for a left-handed user.

Figure 33:
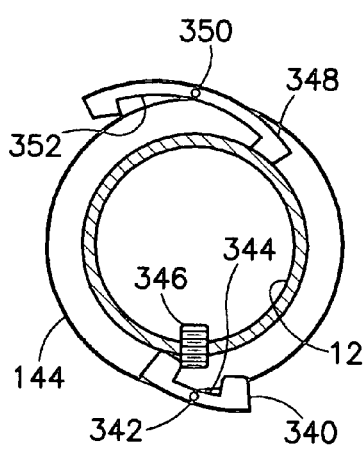

FIG. 33 is a cross section taken along lines 33-33 of FIG. 32.

Figure 34:
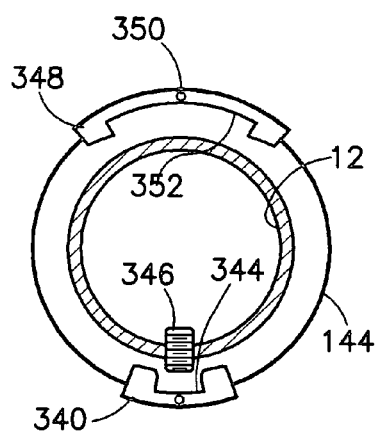

FIG. 34 is a sectional front end view of the main body portion of the gear driven crank handle system mounted on the drive shaft housing shown in condition for free rotation about the drive shaft housing.

Figure 35:
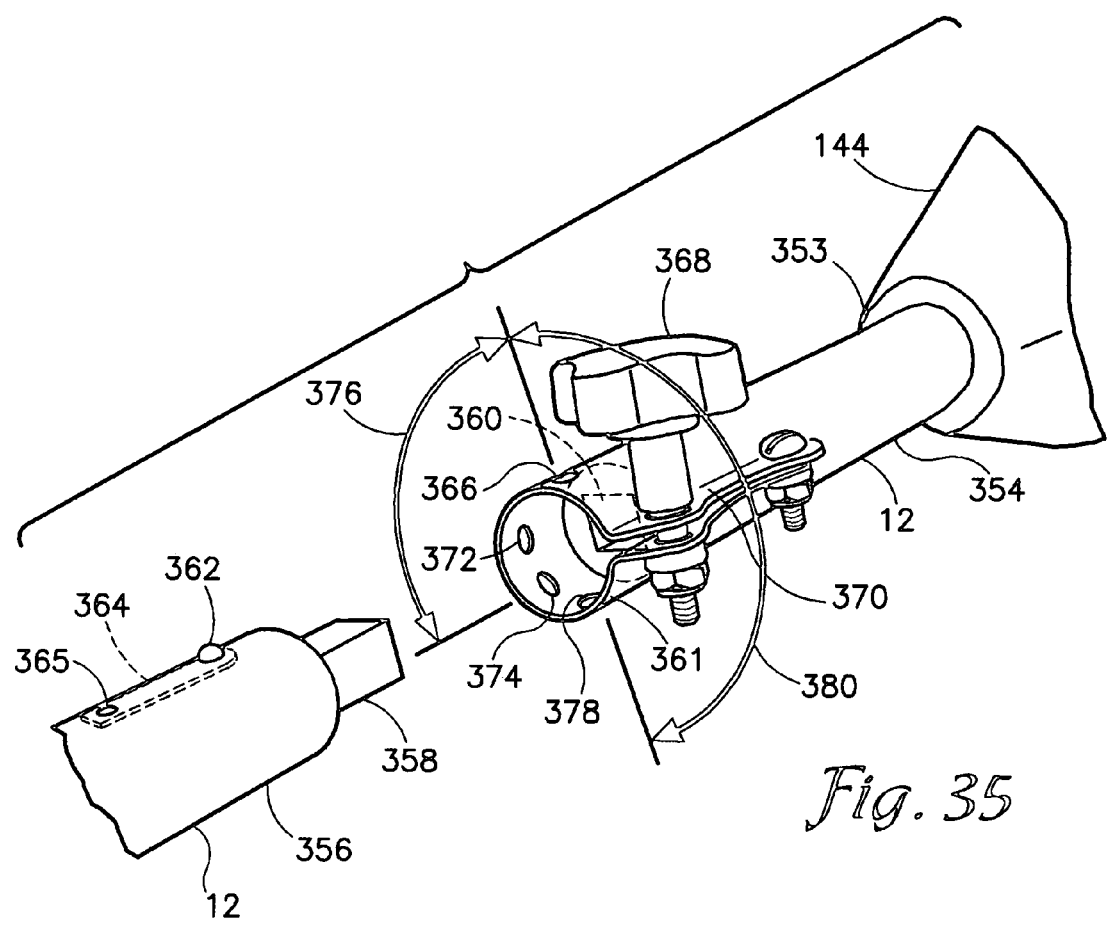

FIG. 35 is an enlarged fragmentary exploded isometric view of the joint mechanism between upper and lower drive shaft housing members, allowing for different working heads to be used interchangeably with the same upper drive shaft housing portion and engine.

Figure 1:
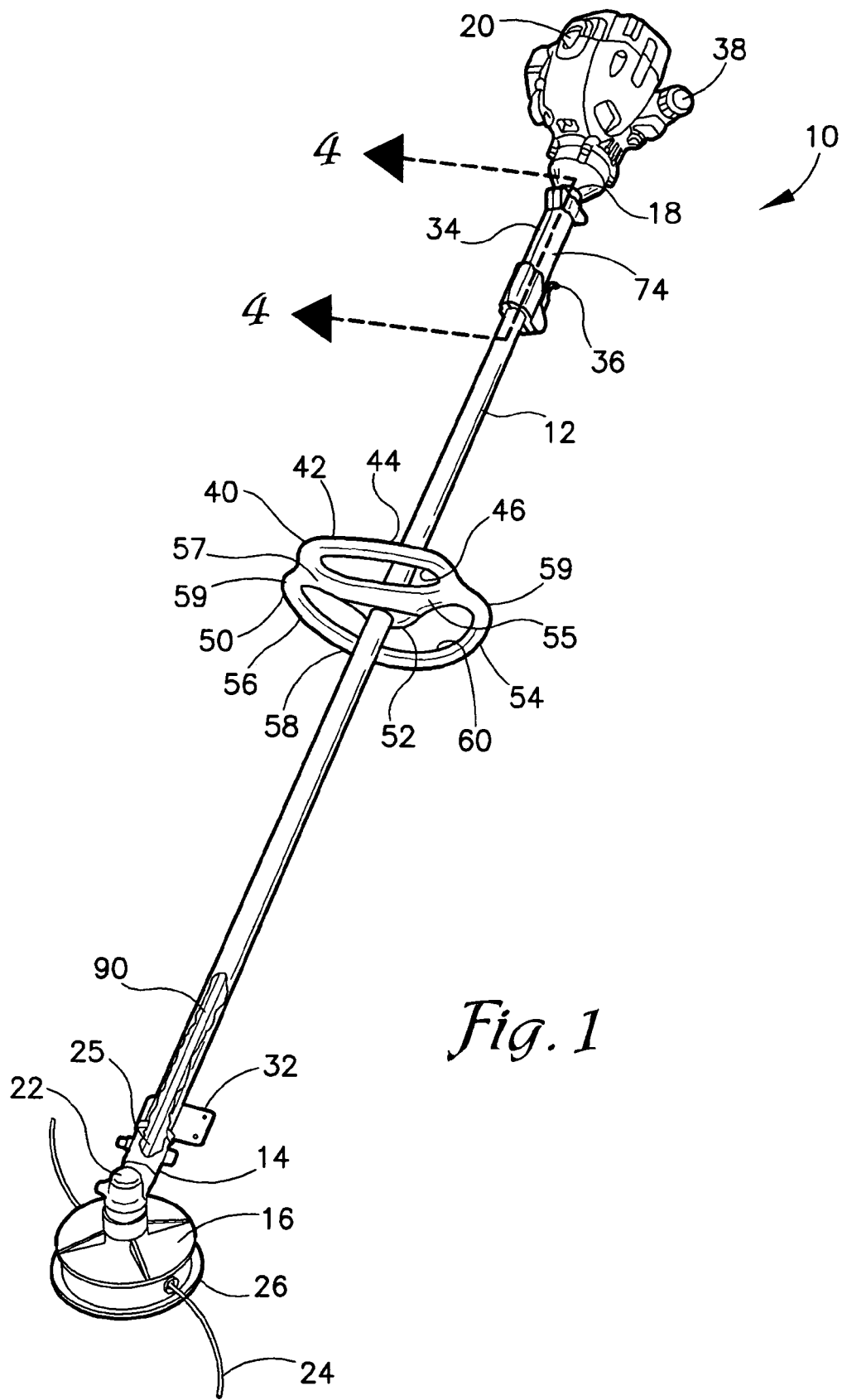
FIG. 1 is an isometric view of a combination blower, trimmer and edger for tending vegetation (lawn care apparatus) according to the present invention shown in use for trimming and blowing and utilizing a three-lobed handle on a straight-shaft lawn care apparatus for facilitating transition of the lawn care apparatus from a trimming to an edging mode.
Figure 36:
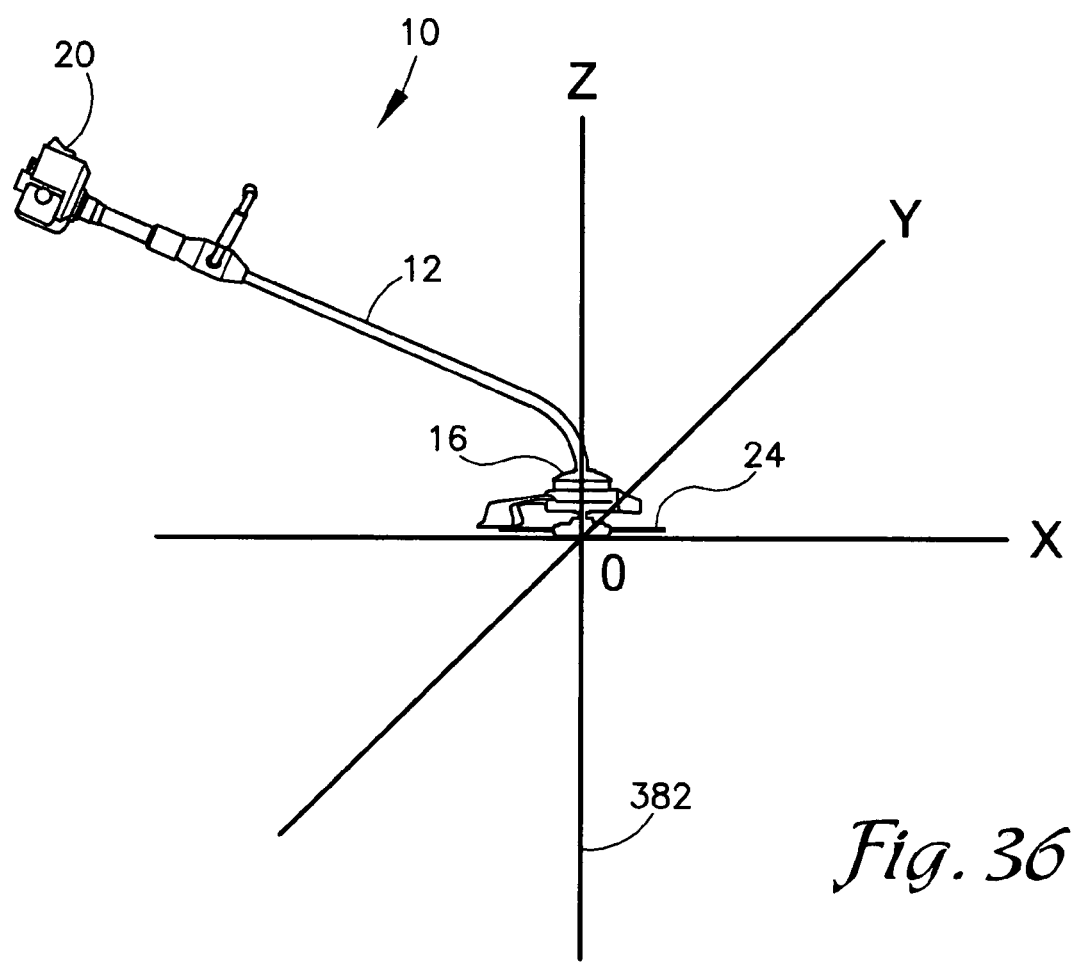

FIG. 36 is a schematic side view of the lawn care apparatus of FIG. 1 shown oriented in an xyz coordinate system.

DETAILED DESCRIPTION OF THE INVENTION

Referring to FIG. 1, a combination blower, trimmer and edger for tending vegetation, that is, a lawn care apparatus, 10 according to the present invention includes an elongated tubular drive shaft housing 12 having a lower, or distal end 14 with a working head 16 attached to it and an upper, or proximal end, 18 having a motor 20 connected to it. The motor 20, which may be either a gasoline engine of four stroke or two-stroke design, or an electric motor, or other suitable power source, which may be battery powered or powered by conventional AC power through a cord, rotates a drive shaft housed within the drive shaft housing 12, which is a straight shaft tool as shown in FIGS. 1-3.

Figure 2:
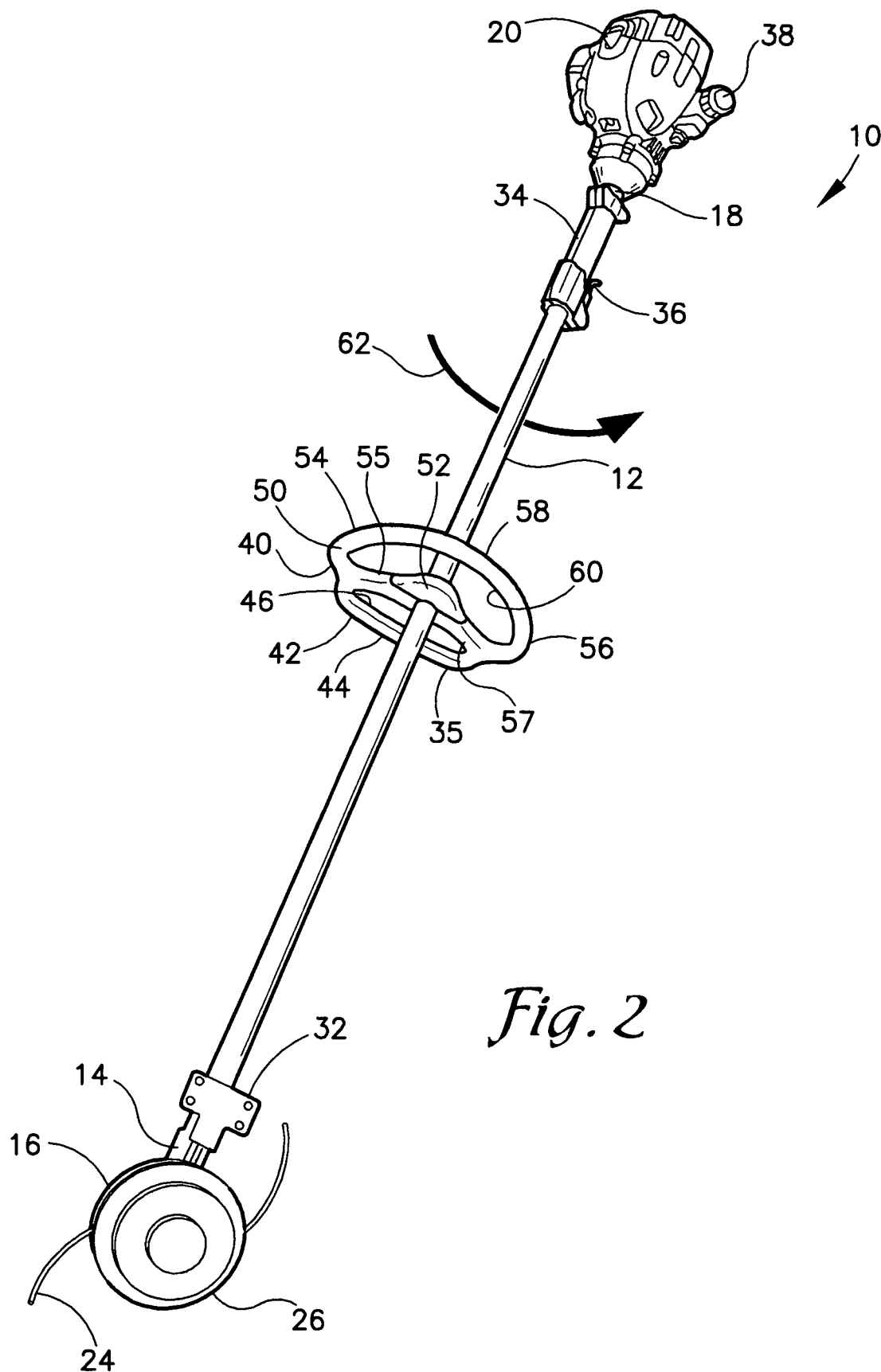
FIG. 2 is an isometric view of the lawn care apparatus of FIG. 1 illustrating the lawn care apparatus in use for edging, which is accomplished by rotating the three-lobed handle about 135° counterclockwise from the point of view of a right-handed person using the lawn care apparatus, which rotates the drive-shaft housing and working head, but not the engine.
Figure 3:
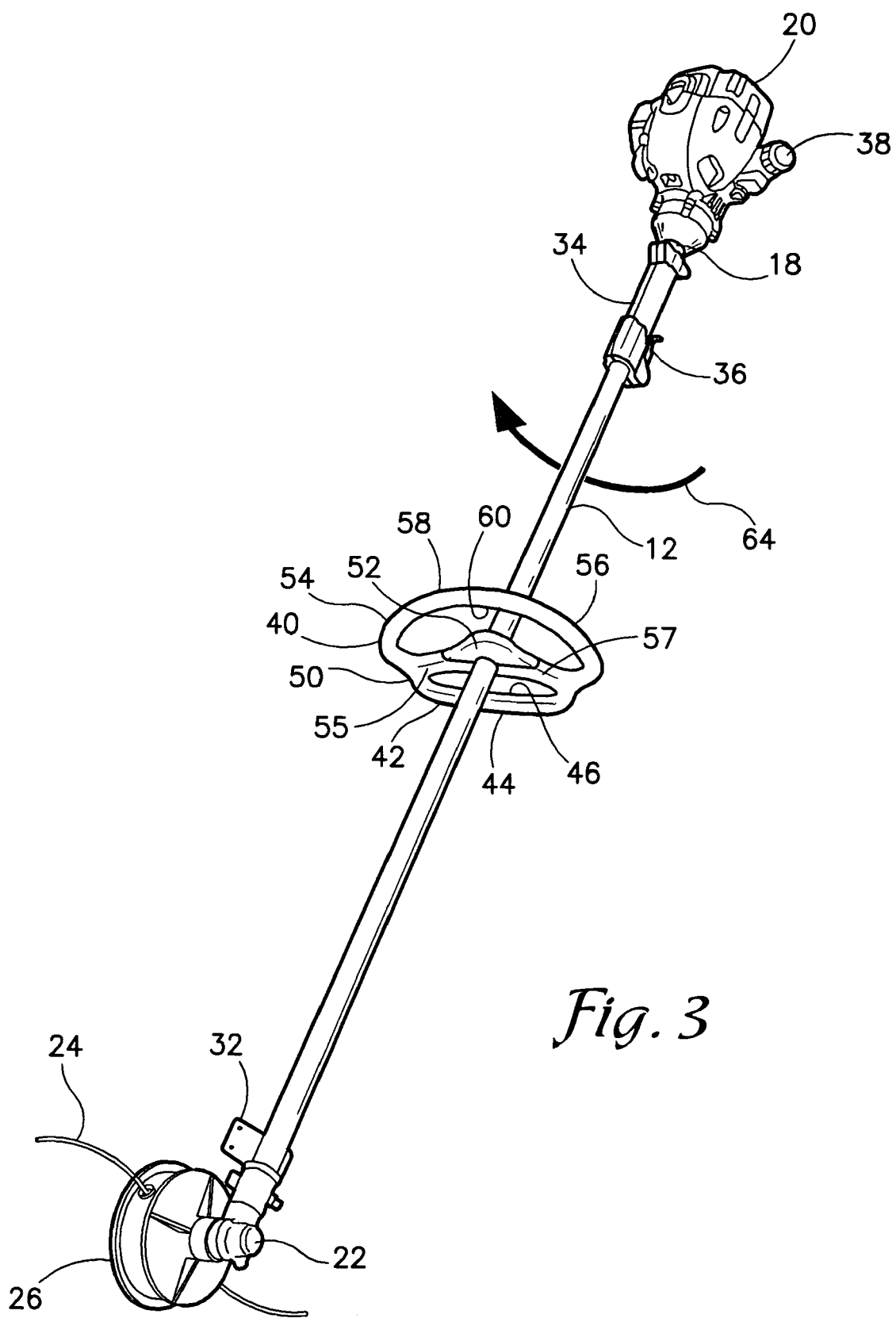
FIG. 3 is an isometric view of the lawn care apparatus of FIG. 1 illustrating the lawn care apparatus in use for edging, which is accomplished by rotating the three-lobed handle 135° clockwise from the point of view of a left-handed person using the lawn care apparatus, which rotates the drive-shaft housing and working head, but not the engine.
Figure 6:
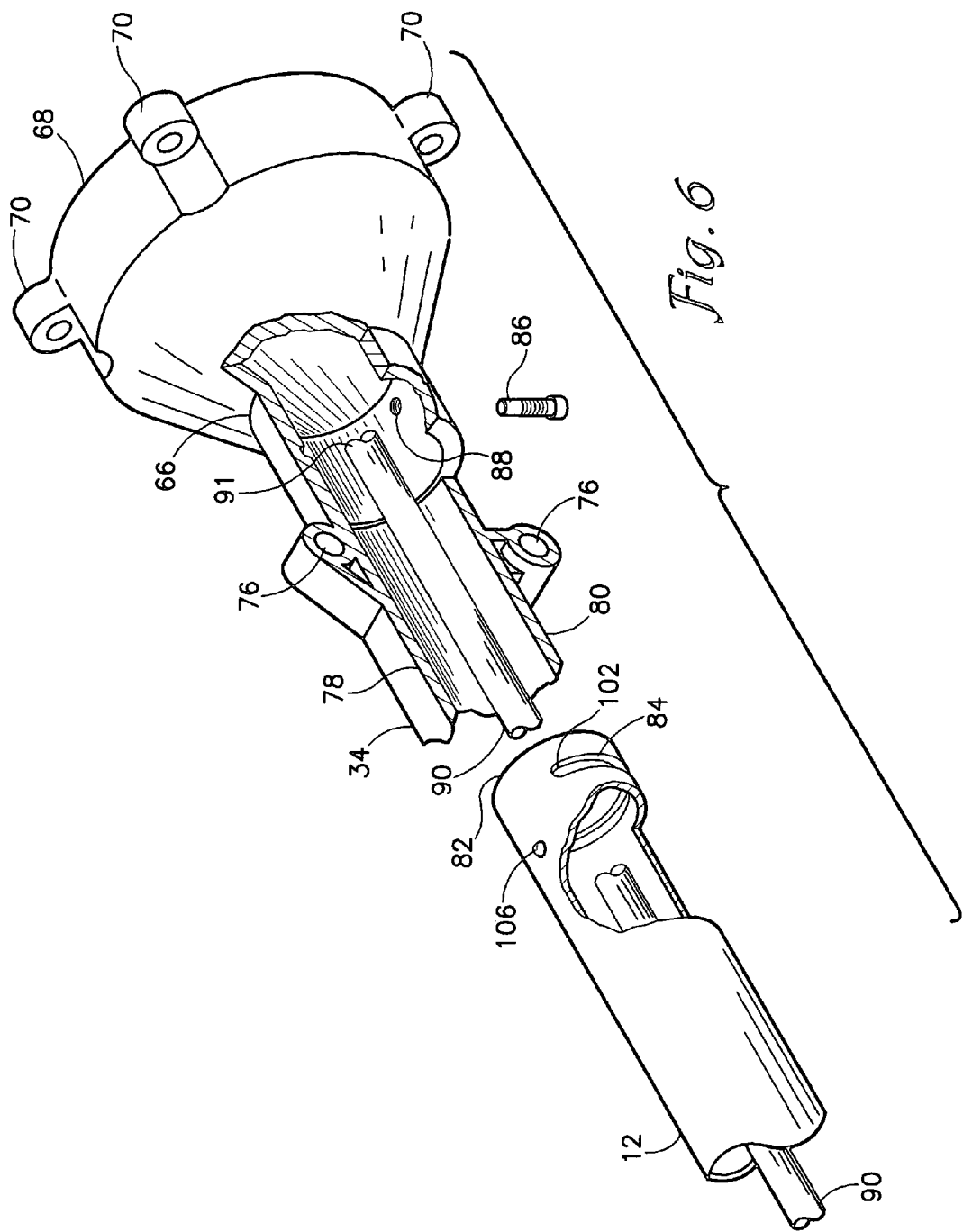
FIG. 6 is an exploded enlarged fragmentary view of the handle portion shown in FIG. 5.

Still referring to FIG. 1, the straight shaft version of FIGS. 1-3 is preferred in commercial turf applications because there is less friction between the drive shaft splines and the drive shaft sleeve inside the drive shaft housing, resulting in lower operating temperatures inside the drive shaft housing and longer life. In order for the lawn care apparatus 10 with the straight shaft 12 to present the working head 16 to horizontal turf when the lawn care apparatus is held in a normal position, the angle of direction of the driving forces must be changed, which is accomplished by the two-gear transmission 22, which conventionally reduces the revolutions per minute (rpm) of the rotating string 24 to one-half of the rpm of the engine 20, and reverses the direction of rotation of the rotating string 24 relative to the engine 20 and doubles the torque applied to the rotating string 24. The transmission 18 itself generates enough heat to burn the user, but reduces the temperature of the drive shaft. The transmission 18, however, adds significantly to the cost of the overall lawn care apparatus 10, so in light-duty, typically consumer applications, a bent drive shaft housing, such as that shown in FIGS. 9, 10, allows the working head 16 to be oriented at basically 90° to the portion of the drive shaft housing that it is connected to and eliminates the two gear transmission 22, saving the manufacturer money, but providing a tool with a shorter life. Further, however, the increased friction created by bending the drive shaft heats the drive shaft housing sufficiently to burn the user and heats the internal plastic spline that houses the drive shaft enough to shorten its life significantly. The present invention is adaptable for use with either a straight shaft lawn care apparatus 10 or a curved shaft lawn care apparatus 10.

Still referring to FIG. 1, the rotating crankshaft of the motor 20 is typically connected to a clutch, which drives the proximal end 91 of a drive shaft or cable 90 (see, e.g., FIG. 4, 6), which in turn is operatively connected at its distal end 25 to a working head 16, such as the string trimmer head 26. In each embodiment, a drive shaft 90 has a proximal end 91 operatively connected to the engine 20 and a distal end 25 operatively connected to a working head 16. A mounting flange 32 is used to mount a shield, such as the shield of FIGS. 9, 10, which has been omitted from FIGS. 1-3 to show the working head 16 more clearly. A human operator who is right-handed, grasps a throttle handle grip, or sleeve, 34, which is adjacent to the lower end of the motor 20, which is fixed onto an upper portion of the drive shaft housing 12, in his left hand and operates the throttle control trigger 36 with his left-hand index finger. In this position, the gasoline tank cap 38 is located furthest toward the right-hand margin of the drawing, and is physically higher than the gasoline tank.

Orientation of the directional terms left-hand, right-hand, clockwise and counterclockwise is determined from the point of view of a person standing adjacent to the engine 20 and facing the working head 16.

Still referring to FIG. 1, the operator grasps the three-lobed handle 40 with his right hand. The three-lobed handle 40 includes a top lobe 42 having a top hand grip 44, which is slightly curved but substantially straight and includes a finger opening 46. The top lobe 42 is the portion of the three-lobed handle 40 closest to the operator when the lawn care apparatus 10 is used for trimming and blowing along a substantially horizontal surface, as shown in FIG. 1. In this trimming and blowing mode shown in FIG. 1, the top lobe 42 is naturally presented to the operator for gripping and no other portion of the three-lobed handle 40 can be comfortably gripped. The three-lobed handle 40 is preferably made in two pieces from injection molded plastic, including an primary section 50 and a fastening section 52 that are fastened together by screws. The three-lobed handle 40 is fixed to the drive shaft housing tube 12 so that these parts can only rotate together, that is, the three-lobed handle 40 does not rotate independently of the drive shaft housing tube 12.

Still referring to FIG. 1, a left-hand lobe 54 and the right-hand lobe 56 are connected by and both include an arcuate hand grip portion 58 having a large finger opening 60 along its length. The left-hand lobe 54 is further connected to the top lobe 44 by the left-hand spoke 55 and the right-hand lobe 56 is further connected to the top lobe 44 by the right-hand spoke 57. The fastening section 52 is actually screwed into the area where the left-hand spoke 55 and the right-hand spoke 57 join in the middle of the distances between the perimeter point where each begins to the approximate center of the three-lobed handle 40. When the lawn care apparatus 10 is in the trimming position shown in FIG. 1, neither the left-hand lobe 54 nor the right-hand lobe 56 can be gripped comfortably due to the hump 59 on either side of the top lobe 42 that forces the operator to move the three-lobed handle 40 into a comfortable gripping position, which is also the desired position for a particular use, e.g., trimming or edging. Left and right are taken from the position of a person standing behind the motor 20 and facing the lawn care apparatus 10 with the working head 16 directly in front of the person. Clockwise and counterclockwise are defined from the point of view of the this same reference person.

Referring to FIG. 2, the three-lobed handle 40 and the drive shaft housing 12 have been rotated together exactly 135° counterclockwise from the position shown in FIG. 1, which places the rotating string 24 into a substantially vertical plane, as shown, while the motor 20 remains in the same position as shown in FIG. 1, that is, with the gasoline tank cap 38 being the portion of the motor 20 that is closest to the right-hand drawing margin. The stationary upright position of the motor 20 is accomplished by allowing the drive shaft housing 12 to slip about a sleeve at its proximal end adjacent to the motor 20, an arrangement discussed in detail in relation to FIGS. 4-8. The ability to retain the motor 20 in a stationary upright position ensures that the motor 20 remains in its desirable operating normal basically upright position, that is, with its crankcase lower than the piston and with the exhaust pipe away from the operator's face. This 135° counterclockwise rotation, as indicated by the directional arrow 62 also presents the right-hand lobe 56 for comfortable gripping and this rotation is used for by a right-handed operator. This rotation also moves the working head 16 out to the right side of the operator somewhat, allowing the operator to work comfortable while moving forward, allowing him to view the work area easily and to see oncoming motor vehicle traffic.

Still referring to FIG. 2, in common practice operators remove the shield from a straight shaft trimmer, thereby removing the string cutting tool and they allow the trimmer string 24 to become very long, for example 0.6-1 m (2-3 feet) in order to see the end of the trimmer string 24 better. The longer trimmer string places extreme loads on the engine 20 and the bearings. Further, it basically converts the rotation of the trimmer string 24 from a horizontal plane to a horizontal plane into a two dimensional rotation problem rather that a three dimensional rotation problem because the apparatus 10 resembles a long axis cutting tool such as a chainsaw. In this case, a rotation of the drive shaft housing 12 of about 90° serves to convert the apparatus 10 from a trimming mode to an edging mode.

Referring to FIG. 3, the lawn care apparatus 10 has been similarly rotated, but 135° clockwise, as shown by the directional rotational arrow 64, which is the direction of rotation for a left-handed user, who will naturally grip the throttle handle grip 34 with his right-hand and the now presented left-hand lobe 54 of the three-lobed handle 40 with his right hand. The motor 20 remains in its normal basically upright position as described in relation to FIG. 2 above, with the working head 16 being projected somewhat to the left of the left-handed user, allowing him comfortably to walk forward while edging and to view both the work area and oncoming traffic while the rotating string 24 rotates in an essentially vertical plane, as shown in FIG. 3.

Referring to FIG. 4, the throttle grip housing 34 is fixedly connected at its proximal end 66 to a conical shaped clutch housing 68, which has four bosses 70 for attaching the engine 20. The throttle grip housing 34 is formed from a right-hand shell member 72 and a mating left-hand side shell member 74 (FIG. 1) that are fastened together by tightening screws into the screw fittings 76, creating a top seam 78 and a bottom seam 80. The throttle grip housing 34 is shown with a top and bottom seam 78, 80 for purposes of clarity and this construction is commonly in the art, but it is preferable to provide seams on the left-hand a right-hand sides of the throttle grip housing 34 so that when the user grasps the throttle grip housing 34 there is no chance that the seams will open up, which can pinch the user's hand. The drive shaft housing 12 is inserted into the hollow body of the throttle grip housing 34 so that its proximal end 82 abuts the clutch housing 68. The drive shaft housing 12 is firmly seated in the throttle grip housing 24, but can be rotated inside it by firmly twisting the drive shaft housing 12 relative to the throttle grip housing 34.

The engine 20 is fixed to the clutch housing 68 and the working head 16 is fixedly connected to the distal end of the drive shaft housing 12, so when the drive shaft housing 12 is twisted relative to the throttle grip housing 34, the working head 16 rotates with the drive shaft housing 12 and the engine 20 does not. This arrangement works in the same fashion with either a curved shaft of straight shaft lawn care apparatus 10.

Still referring to FIG. 4, to limit the rotation of the drive shaft housing 12 and to prevent it from being unintentionally removed from the throttle grip housing or sleeve 34, a limiting slot 84 is formed into the drive shaft housing 12 immediately adjacent to its distal end, about a portion of the circumference of the drive shaft housing 12 and a rotation guide and limiting screw or other stop member 86 is inserted into a threaded aperture 88 in the bottom of the throttle grip housing and fixed therein so that the rotation guide and limiting screw 84 penetrates the limiting slot 84. The rotation guide and limiting screw 84, or other suitable limiting stud or the like, must be short enough so that it does not interfere with the drive cable or drive shaft 90 and guides the rotation of the drive shaft housing 12 to prevent the drive shaft housing 12 from being pulled free from the engine 20, slipping downward, or so forth, which may cause drive failure. Proximal end 91 of the drive shaft or drive cable 90 is connected to the engine 20, and may be operatively connected to a clutch between the engine 20 and the proximal end 91.

Still referring to FIG. 4, the throttle control trigger 36 include a pivot point peg 92 fastened into the throttle grip housing 34 and an aperture 94 that receives a hooked end 96 of the throttle cable 98, with hooked proximate end 100 of the throttle cable 98 being inserted into a corresponding aperture on the throttle of the engine 20.

Referring to FIG. 5, the left-hand end 102 of the limiting slot 84 stops counterclockwise rotation of the drive shaft housing 12 as shown by the counterclockwise rotational directional arrow 104 when it butts into the limiting screw 86 and the right-hand end 106 of the limiting slot 84 stops clockwise rotation of the drive shaft housing 12 when it butts into the limiting screw 86 when rotated clockwise as shown by the clockwise rotational directional arrow 108. Total rotation allowed by the limiting slot lies in a range of 110°-160°, with the strongly preferred range of rotation being 135°, as shown enlarged in FIG. 6. The rotation of the drive shaft housing 12 independently of the throttle handle grip 34 and the engine 20 is utilized by the lawn care apparatus 10 with the three-loped handle 40 of FIG. 1, the crank operated gear driven handle of FIG. 9, or any other type of handle.

Referring to FIG. 7, an alternative embodiment throttle handle grip 110 formed from an upper clamshell half 112 and a mating lower clamshell half 114 fastened together by adhesives or other suitable fasteners to clamp the drive shaft housing 12 firmly while still permitting rotation of the drive shaft housing 12 independently of the throttle handle grip 110 utilizing the slot 84 mechanism described above. A set screw 116 is inserted through an aperture in a cam lever lock 118 and is received and tightened into the threaded aperture 120 in the upper clamshell half 112. A cam surface 122 on the cam lever lock 118 is pressed against a cam receiving fitting 124 in the aperture 126 in the lower clamshell have 114 such that when the cam lever handle 128 is turned in the direction of the arrow 1140 (FIG. 8), the upper and lower clamshells 112, 114, the upper and lower clamshells 112, 114, are clamped together firmly enough that the drive shaft housing 12 cannot be rotated within the throttle handle grip 110 with normal effort, that is, the drive shaft housing 12 is locked into the rotated position it was set to prior to turning the cam lever 128. To release or unlock the cam 120 and allow rotation of the drive shaft housing 12 relative to the throttle handle grip 110 again, the cam lever 128 is turned in the opposite direction as shown by the arrow 130 in FIG. 7.

Still referring to FIG. 7, each clamshell half 112, 114, includes a plurality of upstanding reinforcing ribs 132, each having a concave curved surface 134 that defines a semicircle and that grip the drive shaft housing 12 when the upper clamshell half 112 and the lower clamshell half 114 are joined together as shown in FIG. 8 and a flat left-hand flange portion 136 and a flat right-hand flange portion 138. These reinforcing ribs strengthen the throttle handle grip 110 and dampening vibrations in the drive shaft housing 12 during operation.

Referring to FIG. 8, the assembled throttle handle grip 110 is illustrated, showing the locking action of the cam lever lock 118.

Referring to FIG. 9, a gear-driven crank handle shaft rotation system 142 (crank handle system) is mounted onto the drive shaft housing 12 in the same fashion as the throttle handle grip 110 of FIG. 8, 9 and is located below the throttle grip 34 or 110 and at the approximate longitudinal center of gravity. The crank handle system 142 includes a housing 144 and a handle 146 protruding from the housing 144. When the lawn care apparatus 10 is in the trimming position, that is with the trimming string 24 and the debris shield 148 basically horizontal, the grip portion 150, which is covered by the high-friction rubber comfort grip 151 (best seen in FIG. 10) of the handle 146 is horizontal while the extension arm portion 152 of the handle 146 projects upward from the drive shaft housing 12 and is basically perpendicular to it. The housing 144 has a two-piece clamshell structure that grips the drive shaft housing 12 (e.g., FIG. 13) firmly enough that the drive shaft housing 12 rotates with it, that is, the housing 144 and the connected crank handle 146 cannot turn independently of the drive shaft housing 12, while the drive shaft housing 12 can rotate independently of the engine 20 using the structure shown in FIGS. 4, 5, discussed above.

Still referring to FIG. 9, a blower housing 154 enclosed a ring blower, or impeller, 155 that is operatively connected to the distal or lower, end 14 of the drive shaft housing 12 and includes an air outlet duct 156 having a top wall 158 and a bottom wall 160, which are closer together at the outer edge 162 of the air outlet duct 156, that at the blower housing 154, as are the left-hand side wall 164 and the right-hand side wall 166 (FIG. 10) of the air outlet duct 156, providing a nozzle with a venturi effect that accelerates the air moving through the air outlet duct 156 as it passes through the nozzle or air outlet duct 156. The ring blower, or impeller, 155 is superior to the commonly used volute or spiral blower because the ring blower, or impeller, 155 occupies a smaller volume, while maintaining high velocity and high volume air flow, thereby not interfering with the trimmer string 24 or the operator's sight lines. The same constricted nozzle design is retained regardless of the general shape of the air outlet duct, which may be conical, oval, etc.

Still referring to FIG. 9, a the point 170 defines the origin of a three dimensional space conveniently plotted as the xyz space 171 and defines the center of the trimmer string 24, with a first portion 172 and a second portion 174 having equal lengths and spanning a total distance from the first portion tip 176 to the second portion tip 178 preferably lying in a range of about 30-76 cm (12-30 inches), with the preferred length being 43 cm (17 inches). The trimmer string 24 may be one length of string as utilized in some types of string trimmer heads or two separate lines as shown in, for example, FIG. 9, or more than two separate strings. During operation, all strings will be cut to equal length because the debris shield 148 includes a line cutter.

Still referring to FIG. 9, the air outlet duct 156 and its outlet edge 162 are aimed downwardly to direct the air flow at the outer tip ends 176, 178 of the trimmer string 24, thereby increasing and maximizing the debris dispersion capability of any particular lawn care apparatus 10 for any given size of motor or engine 20 and reducing or eliminating the lift imparted to the rotating string 24 by air blowing over the trimmer string 24. When the outlet nozzle is parallel to the trimmer string 24, the lift imparted due to Bernoulli's principle is considerable, causing the rotating trimmer string to depart from its otherwise planar rotation, thereby placing excess strain on bearings and the like, wasting engine power, decreasing the effectiveness of the trimming function and reducing operator control over the height of the cut being made.

Referring to FIG. 10, the handle 146 includes a stem portion 180 that protrudes from the housing 144 of the crank handle system 142 and is connected to a gear inside the housing 142, as described below. The stem portion 180 can be rotated about its own longitudinal center line from its neutral equilibrium position shown in FIG. 9 in either a clockwise direction (as seen from a position looking down on the stem portion 180) as shown by the arrow portion 182 or clockwise (as seen from a position looking down on the stem portion 180) as shown by the arrow portion 184 of the double-headed directional arrow 186, which allows a total rotation of the stem portion 180 in a range of 105°-165°, with the preferred rotation being 135°, with one-half of any rotation being clockwise of the equilibrium or neutral position and one-half of any allowed rotation being counterclockwise of the neutral position.

Still referring to FIG. 10, the stem portion 180 has been rotated 135° in the direction indicated by the directional arrow 188 in FIG. 9, that is, by the operator's pulling the handle grip 151 back toward himself, thereby rotating the rotating string 24 into a vertical plane on the user's left-hand side, resulting in the handle 146 being rotated into the position shown in FIG. 10, while maintaining the engine 20 in its normal upright position. With the handle 146 in the position shown, the string trimmer head 26 is also moved outward to the user's left side, thereby allowing the operator to hold the lawn care apparatus 10 in a natural position substantially identical to the position used for trimming in a horizontal plane and allowing the operator to walk forward while edging and easily maintaining a straight line that he can see throughout the operation, while also seeing oncoming traffic.

Referring to FIG. 11, the housing 144 includes a locking set screw 190 that permits easy manipulation of the rotating handle 146 when loosened and locks the handle 146 into its desired position when tightened. As shown, the handle 146 is in its normal position for trimming, with the rubber grip 151 above the housing 144.

Referring to FIG. 12, the handle 146 has been rotated about the stem portion 180 in the direction of the directional arrow 192 by 135° to rotate the housing 144 toward the viewer by 90°, presenting the bottom surface of the housing 144 as the portion of the housing 144 closest to the viewer. Since the working head 116 is rigidly connected to the drive shaft housing 12 and, through it, the housing 144, the working head 14 has also been rotated 90°, as shown in FIG. 10. This rotation of the housing 144 also exposes to view the air flow shut-off control lever 194, which is connected to the housing by the rivet 196, allowing the operator to move the control lever 194 between an on position and an off position or any intermediate position through a cable 198, which may be run along the outside of the drive shaft housing, or, in the case of a non-split boom tool, inside the drive shaft housing, and shut off valve system shown in detail in FIGS. 20-21. This air shut off valve allows the user to select the desired volume of air expelled from the blower housing 154.

Referring to FIG. 13, the stem portion 180 includes a proximal end 198 that is fastened to stop member collar 200 and then to a first 45° beveled gear 202 having an access parallel to the stem 180 and which meshes with a mating second 45° beveled gear 204 that is rigidly mounted onto the drive shaft housing 12, which passes through the hole 206 in the mating 45° beveled gear 204. Each beveled gear 202, 204 is molded from tough durable nylon and has thirty-three teeth, or other 1:1 gear ratio, so that turning the stem portion 180 resulting in a 1:1 rotation of the drive shaft housing 12. Rotation of the stem portion 180 is limited by the stop collar disk 205, which includes a recessed land portion 207 that extends over 135° of the stop disk 205, with the stop rod 211, fastened to the stem portion 180, bumping into the resulting upstanding flange portion 209 at either end of the allowed range of rotation, as discussed in more detail below in connection with FIG. 29.

Still referring to FIG. 13, the housing 144 includes an upper clamshell member 208 and mating lower clamshell housing member 210 that form a horizontal seam 212 when clamped together by the rear set screw 214 and the forward set screw 216, and to conceal and protect the two beveled gears 202, 204. Each clamshell member 206, 208 includes about twelve upstanding reinforcing rib portions 218, each having a semi-circular recess portion 220 that fits against the outer surface of the circular cross section drive shaft housing 12 firmly to hold the housing 144 firmly against the drive shaft housing 12. The midpoint of the semi-circular recess of each reinforcing rib portion 218 is in the center of the distance between the outer edges of the width of the clamshells 208, 210. Each reinforcing rib portion 218 also includes a left and right hand flat outer flange portions 222. These portions are aligned with one another on the upper and lower clamshell members 208, 210 and contact each other when the two clamshells 208, 201 are brought together. The reinforcing rib portions 218 strengthen the housing 144 and dampening vibrations in drive shaft housing 12 during operation, increasing operator comfort and reducing the likelihood of carpal tunnel syndrome in operators. Three stem housing ribs 224 perform the same functions in the stem housing portion 226 of the housing 144 that extends outwardly and perpendicularly to the main housing body 228 to provide support for the stem 180 portion of the handle 146.

Still referring to FIG. 13, the throttle-like air valve control lever 194 is held in the bracket 230, which includes a circular lid portion 232 and a stem-like fastening portion 234 that is fastened to the housing 144 by screws or the like.

Still referring to FIG. 13, the length of the extension arm portion 152 of the handle 146 can be adjusted to accommodate comfortably different height operators by pressing the spring release button 236, thereby releasing a spring-loaded locking button that is seated in a selected one of the adjustment apertures 238 in an outer end portion 240 of the extension arm portion 152. The proximal end 242 of the outer end portion 240 is received into the cylindrical coupling member 244 and can be set in its desired length by the operator. The lower end portion 246 includes a distal end 248 that is received into and rigidly fixed to the cylindrical coupling member 244 and the outer end portion 240 fits inside the lower end portion 246, which has a slightly larger diameter. This adjustment mechanism allows comfortable upright operating postures for virtually any height operator.

Still referring to FIG. 13, the angle between the grip portion 150 and the outer end portion 240 of the handle 146 is 90° as indicated by the double-headed arcuate arrow 2239 and both of these parts of the handle lie in the same plane, that is, it is formed by bending a tube 90° at the appropriate point. The angle between the stem portion 180 and the lower end portion 240 of the handle 146 is 110° (?) As indicated by the double-headed arcuate arrow 241.

Referring to FIG. 14, the throttle-like air control lever 194 can be adjusted at any point along an arc of 105° as indicated by the double-headed arrow 250 from the fully closed position 252 to the fully open position 254.

Referring to FIG. 15, the throttle-like air control lever 194 can be set into a plurality of discrete positions by setting one of the indexing apertures 256 formed into the circular control plate 258 that is connected to the air control lever 194. The indexing apertures 256 set over a small setting nub in the lid portion 230 of the bracket 230.

Referring to FIG. 17, a compressed coil spring 260 applies force to the circular control plate 258, keeping the throttle-like air control lever 194 in the desired position set by the operator.

Referring to FIG. 18, an open web 262 of air inlet openings 264 allows air to be drawn into the top of the blower housing 154 when the blower, or impeller 155 is rotating, which is expelled through the air outlet duct 156. The open web 262 allows for vigorous air flow, while preventing debris, such a sticks, from being drawn into the blower housing 154, which might otherwise be hurled dangerously. The debris shield 148 preferably includes an outer arcuate perimeter 263 and a pair of outer wing portions 265, which block additional debris and are outside the width of the fan portion 267 that becomes progressively narrower as it comes closer to the blower housing 154, to which it is connected.

Figure 23:
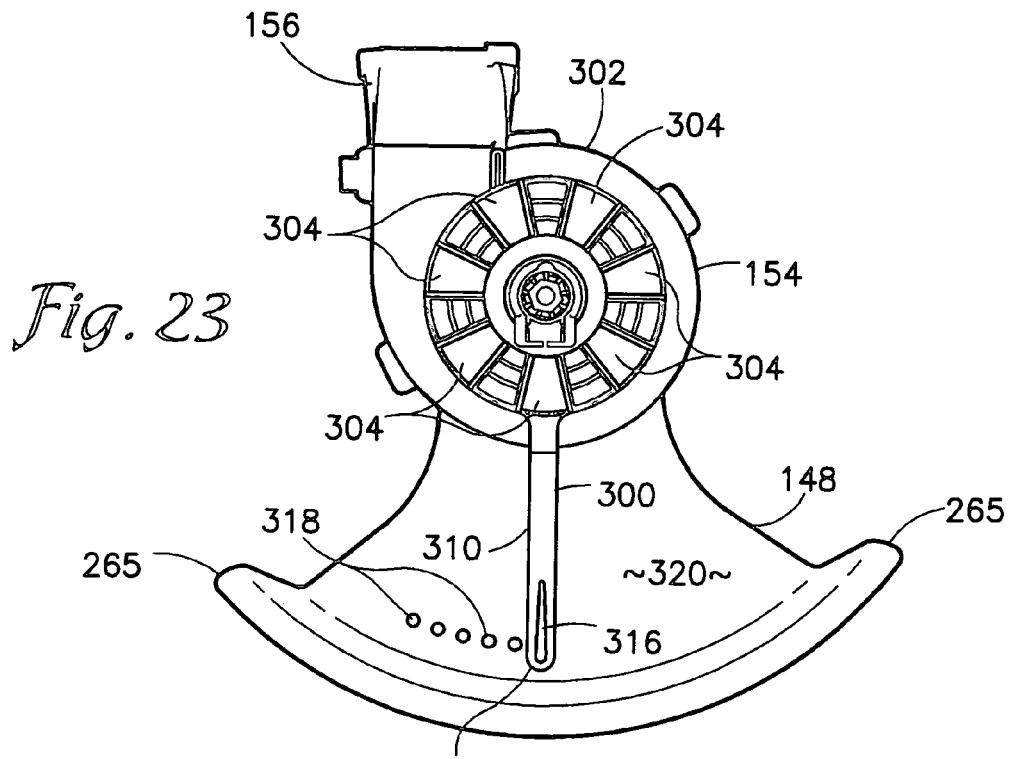
FIG. 23 is a top view of the blower housing and shield assembly of a lawn care apparatus according to the present invention showing an air inlet valve and attached control handle, with the air inlet valve shown in the open position, allowing air to be drawn into the blower when the blower is turning.
Figure 24:
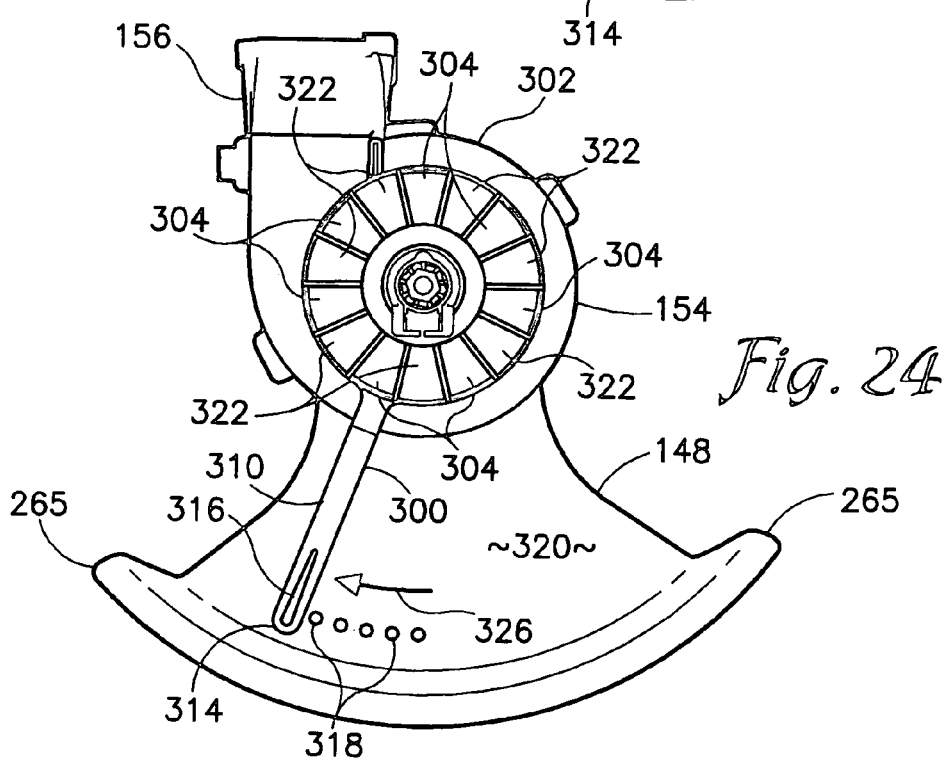
FIG. 24 is a top view of the blower housing and shield assembly of a lawn care apparatus according to the present invention showing an air inlet valve and attached control handle, with the air inlet valve shown in the closed position, substantially depriving the blower of intake air.
Figure 25:
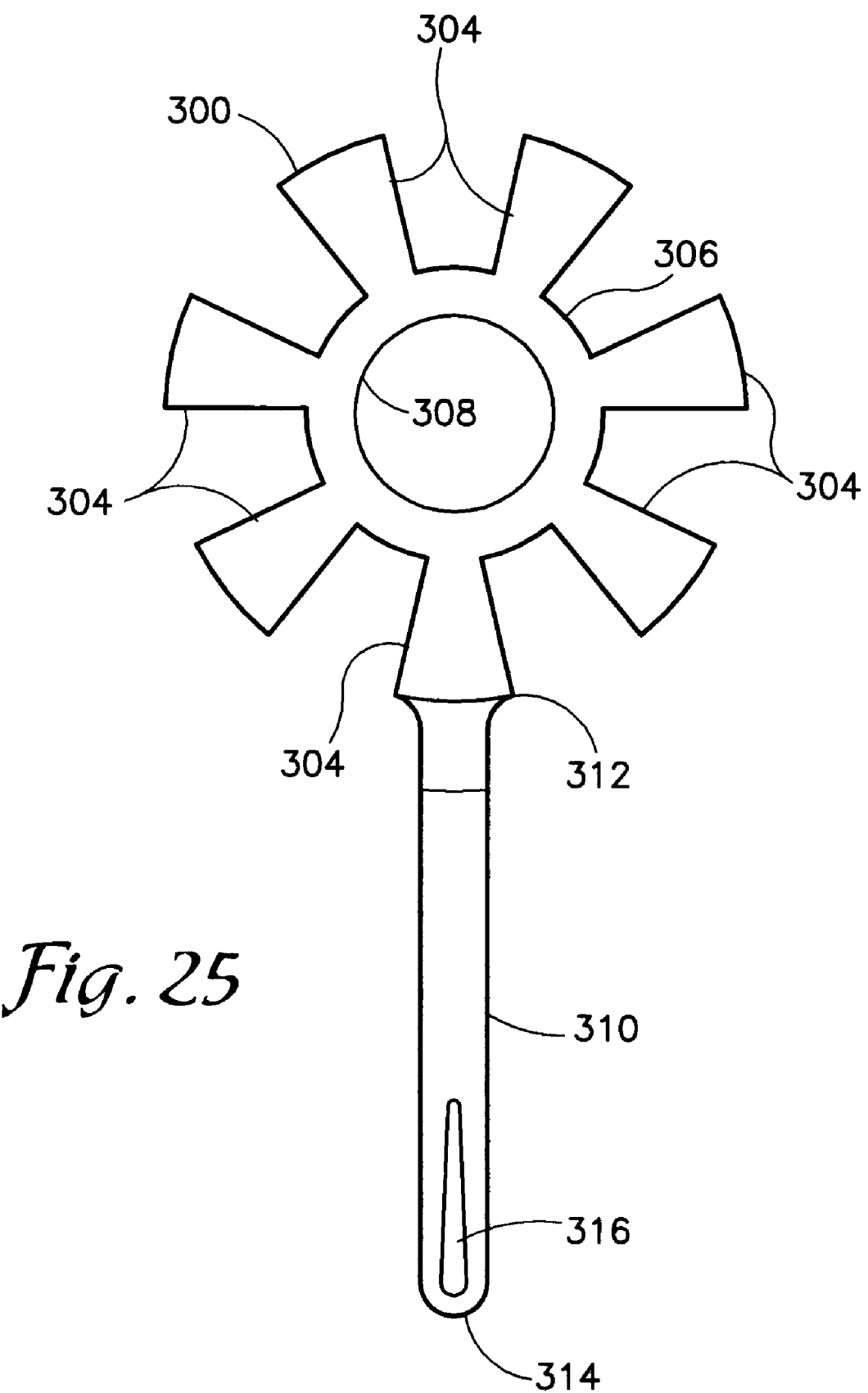
FIG. 25 is a top view of the air inlet valve and control handle of FIGS. 23, 24.

Referring to FIGS. 19, 20, the throttle-like air flow regulating, or control, valve 266, set into the outer edge of the air outlet duct 156 and retained by the pins 270, is urged by the spring 268 into the closed position shown in FIG. 20, in which the outlet opening in the air outlet duct 156 is substantially blocked. When the operator pulls on the cable 197, the throttle-like air flow control valve 266 is progressively opened, until the butterfly valve portion is essentially parallel to the upper and lower walls 158, 160 of the outlet duct or nozzle 156, maximizing air flow through the blower housing 154. Alternatively or simultaneously, the air flow through the blower housing 154 may be progressively reduced or increased or essentially shut off by a valve mechanism at the air inlet open web 262, as shown in FIGS. 23-25 and discussed below.

Still referring to FIG. 19, shows the throttle-like air flow control valve 226 in the closed position, substantially shutting off the air flow, which is accomplished by rotating the throttle-like air flow control valve 226 in the direction of the arrow 274 by pulling on the cable 197 sufficiently to overcome the tension of the spring 268. Letting off on the cable 197 allows the spring 268 to move the throttle-like air flow control valve 226 in the direction of the arrow 276, thereby progressively and selectively opening the control valve 226.

Decreasing the air flow through the blower 155, through manipulating the valve 266 or a valve in the open web 262, or both, increases the proportion of engine 20 power available to drive the trimmer string 24 because the work being performed by the blower, or impeller, 155 is reduced, as is the volume of air passing through the blower, or impeller, 155. This effect is maximized when the air flow through the blower, or impeller, 155 is substantially closed off. Even with the air flow control valve 266 in the fully closed position, however, some air is moved by the blower, or impeller, 155, which draws air through the hollow tubular drive shaft housing 12, cooling it, thereby preventing overheating and extending the life of the drive shaft cable 90 and associated bearings or sleeves. In curved shaft string trimmers, heat buildup in the general area of the curve in the drive shaft housing is conducted to a spool of plastic trimmer string and heats the trimmer string enough to partially melt it, welding the reserve supply of trimmer string to itself, a common and aggravating problem wholly overcome by the blower, or impeller, 155 as described.

Referring to FIG. 20, a guard bracket 278 includes an outer guard portion 280 connected at one end to a left-hand leg portion 282 and a right-hand leg portion 284 which are substantially parallel to one another and substantially perpendicular to the outer guard portion 280 and each of which includes an inwardly projecting fastening end portion 286, that snap into aligned apertures in the air outlet duct 156. The guard bracket 278 helps protect the air outlet duct 156 from damage from dragging or banging, which is more likely when the lawn care apparatus 10 is used for edging by a left-handed operator, which results in the air outlet duct 156 being close to the ground and therefore susceptible to damage. The guard bracket 278 is preferably made from heavy gauge spring steel.

Figure 21:
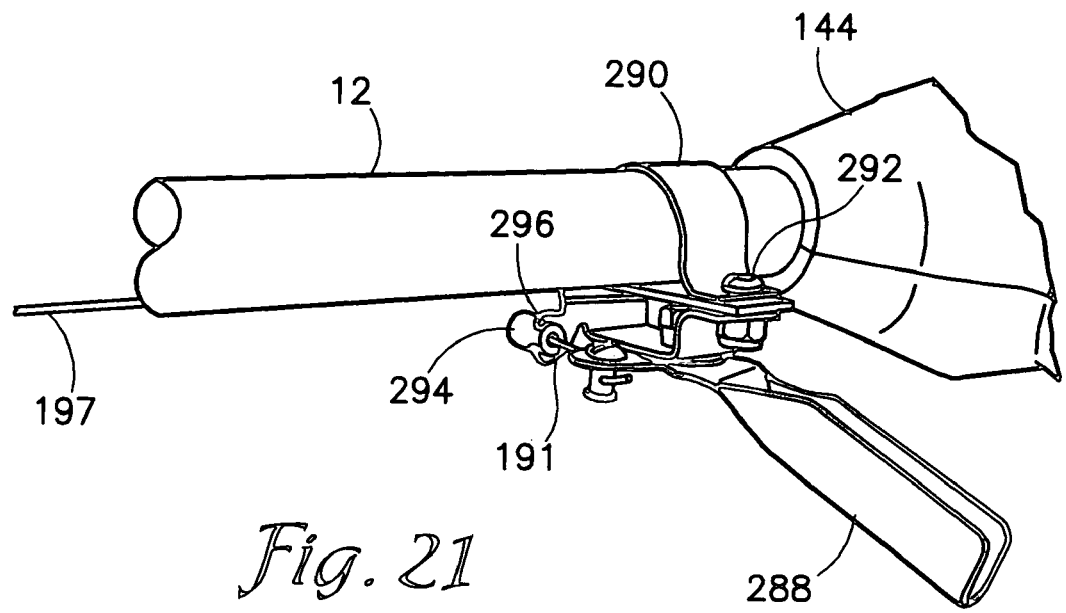
FIG. 21 is an isometric view of the air outlet shut-off valve control lever for use with the lawn care apparatus of FIG. 1 showing the control lever in the position it is in when the butterfly air inlet shut-off valve in the open position, allowing air to be blown out of the blower nozzle readily during operation.
Figure 22:
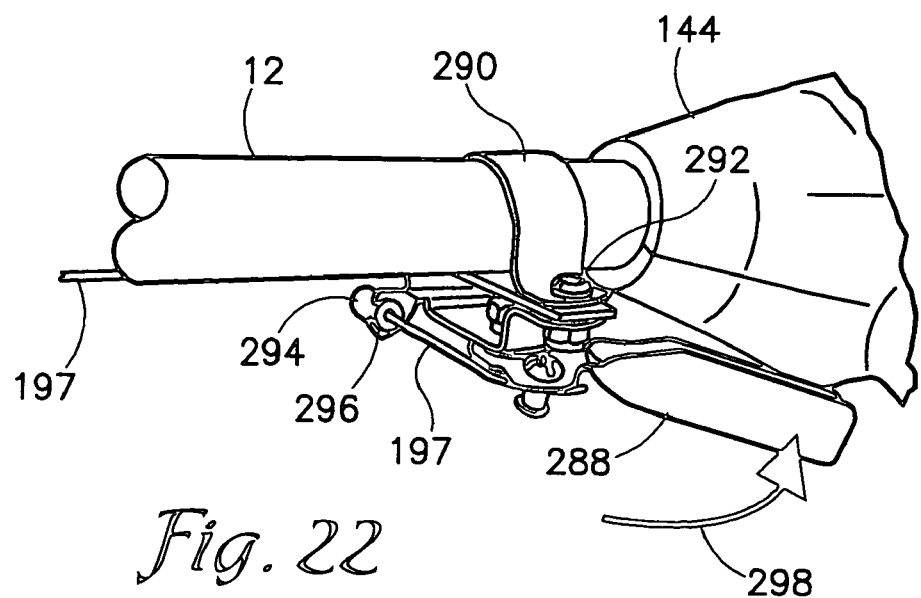
FIG. 22 is an isometric view of the air outlet shut-off valve control lever for use with the lawn care apparatus of FIG. 1 showing the control lever in the position it is in when the butterfly air inlet shut-off valve in the closed position, preventing air from being blown out of the blower nozzle readily during operation.

Referring to FIG. 21, in an alternative air-flow valve control lever for opening, closing or setting an intermediate opening of the throttle-like air flow control valve 266, a pivoting handle 288 is connected to the drive shaft housing 12 by the clamshell bracket 290, which is secured by the nut and bolt 292. The cable 197 has a ball fitting 294 in its end, which locks the cable 197 into the cable lock aperture 296 on the handle 288. In this embodiment, the cable 197 runs along the outside surface of the drive shaft housing 12, which is necessary when the lawn care apparatus includes a split boom construction that allows different working heads 16 and attached lower boom portions to be connected to the same upper boom portion and engine, as shown in FIG. 30. The throttle-like air shut off valve 266 is in the closed position when the handle 288 is in the position shown in FIG. 21 and is allowed to be opened by spring force when the operator pulls back toward himself in the direction of the arrow 298 in FIG. 22, causing the cable 197 to go slack.

Referring to FIGS. 23-25, an air inflow regulating, or control valve, 300 in the top 302 of the blower housing 154 includes seven fan shaped blades 304 each having a narrow end connected to a circular hub 306 having an aperture 308 in its center. An elongated control handle 310 is connected to the fan shaped blade 312, which allows the air inflow control valve 300 to be rotated easily. Adjacent to a proximal end 314 of the control handle 310 includes a locking slot 316 that locks the air inflow control valve 300 into the operators desired position when it any of the indexing nubs 318 on the top surface 320 of the debris shield 148 penetrates the locking slot 316.

As shown in FIG. 23, the air inflow control valve 300 is open, so that the fan shaped blades 304 align with and are physically above the mating seven baffles 322 in the air inflow guard 324 of the blower housing 154, allowing for maximum air intake.

Referring to FIG. 24, the control handle 310 has been moved in the direction of the arrow 326, providing the closed sealed appearance of the seven baffles 322 in the air inlet itself and the seven fan shaped blades 312, which together cover the entire circular air inlet system for the blower, or impeller, 155, substantially closing off the air supply to the blower, or impeller, 155, reducing the work it performs and its load on the engine 20, allowing more engine 20 power to be applied to the trimmer string 24, and so forth as discussed above in connection with FIGS. 18-20. The control handle 310 can be adjusted to any intermediate position between a valve fully opened and a valve fully closed position in basically infinite increments as selected by the operator. Both types of air control valves disclosed herein can be used simultaneously on the same lawn care apparatus 10 having a blower and string trimmer on the same tool. In many trimming applications, for example, along a fence in a grass yard, blowing debris away is not needed or desired and in these cases it is beneficial to cut off the supply of air to the blower, or impeller, 155 or to cut off the flow through the air outlet duct, or both.

Referring to FIG. 26, the handle housing 144 is rotated is rotated 180° clockwise relative to the drive shaft housing 12, with the handle housing 144 being loosened prior to rotation, as indicated by the arrow 328 to move the handle 146 into position for use by a left-handed operator, moving the handle 146 along the direction of the arrow 330. The starting position is shown in FIG. 25, in which the debris shield 148 is essentially horizontal and closer to the operator than the air outlet duct 156.

Referring to FIG. 27, the lawn care apparatus 10 has been moved into position for use in edging by a left-handed operator, in which the debris shield 148 is basically vertical and the air outlet duct is not visible because it is the lowest par of the blower housing 154. This position is achieved by rotating the handle 146 in the direction of the arrow 332, which rotates the drive shaft housing 12 in the direction fo the arrow 334 so that the rigidly connected debris shield 148 rotates into the essentially vertical plane shown. The set screws 214, 216 are loosened to permit rotation of the handle 146 relative to the drive shaft housing without moving the drive shaft housing 12 relative to the engine 20 and are tightened to lock the handle housing 144 146 rigidly onto the drive shaft housing 12 when the desired orientation of the main housing body 228 has been achieve.

Figure 28:
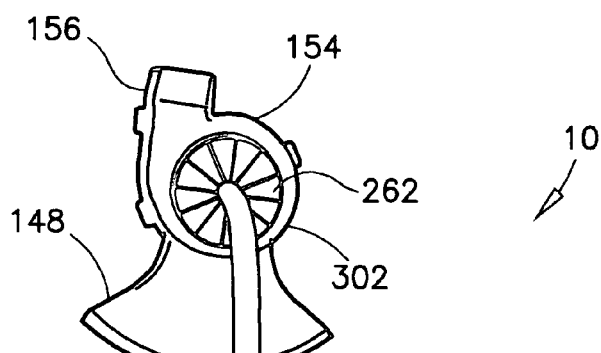
FIG. 28 is a user's top view of a lawn care apparatus according to FIG. 1 having the alternative embodiment handle of FIG. 9 illustrating the position of the handle when the lawn care apparatus is used for trimming, that is, with the trimming string rotating in a basically horizontal plane when used in a left-hand user position.

Referring to FIG. 28, the lawn care apparatus 10 is shown after being moved into position for left-handed use in the trimming mode, with the handle 146 on the right-hand side of the drive shaft housing 12 and the debris shield 148 basically horizontal, which is the position achieved through the manipulation indicated in FIG. 27.

Referring to FIG. 29, the stop collar disk 205 allows the stem portion 180 of the handle 146 to be rotated along the directions of the double-headed arrow 336 through a range of 135° between the upper stop flange portion 209 and the lower stop flange portion 338, with the stop rod 211 bumping the upper stop flange 209 when the lawn care apparatus 10 is in the trimming position for a right-handed person, as in FIG. 9, and bumping against the lower stop flange 338 when the lawn care apparatus 10 is in the edging position for a right-handed operator, as shown in FIG. 10.

Referring to FIG. 30, 31, the stem portion 180 of the crank handle 146 includes an upper toggle latch, or trimming latch and stop member, 340 connected to the housing 144 by the pivoting connection 342 in its center. A channel 344 along the lower surface of the upper toggle latch 340 includes left side and right side upstanding walls that serve as stops when butted against by the alien wrench stop screw 346. The operator can press down on either end of the upper toggle latch 340 to allow the housing 144 to clear the top of the set screw 346 and permit rotation of the housing 144 about the drive shaft housing 12 until another desired position is achieved, such as the position shown in FIGS. 32, 33 and used for left-hand operators who are trimming. Similarly, an edging mode toggle latch and stop member 348 is pivotally connected to the outer surface of the housing 144 at the pivot point 350. To move the lawn care apparatus 10 from the trimming to the edging position by releasing the trimming latch and stop member 340, rotating the housing 144 and then depressing the relevant end of the edging mode toggle latch and stop member 348 to raise it and to allow the alien wrench stop screw 344 to enter the edging mode locking channel 352, then releases the edging mode toggle latch and stop member 348, locking the housing 344 into the edging mode. The crank handle 146 is also rotated as described above. If desired, as shown in FIG. 34, the alien wrench stop screw 344 can be recessed below the outer surface of the housing 144 to permit full and free rotation of the housing 144 about the drive shaft housing 12 in response to cranking the handle 146. For any use of short duration, this is the preferred mode because frictional losses throughout the system will prevent undesired rotation of the housing 144 relative to the drive shaft housing 12 in most applications.

Referring to FIG. 35, in an alternative embodiment, the drive shaft housing 12 and the drive shaft cable 90 have been cut in two at a point below the lower end 353 of the housing 144, creating an upper boom section 354 and a lower boom section 356. Protruding from the lower boom section 356 is a drive shaft square end fitting 358, mates with the recesses drive shaft socket 360, recessed into the distal end 361 of the upper boom section 354. The lower boom section 356 slides inside the lower end of the upper boom section 354 until the drive shaft square end fitting 358 mates with the recessed drive shaft socket 360. The positioning button 362, slightly spring biased upward by the spring strip 364 it is fastened to, with the spring strip 364 in turn fastened to the lower boom section 356 by the rivet 365, springs into the neutral locating aperture 366, signifying to the operator that full engagement of the shaft parts has been achieved and that the apparatus is in position for trimming by a right-handed user. Then the operator tightens the clamp adjustment screw 368, in turn tightening the drive shaft housing clamp 370 and securing the upper and lower boom sections 354, 356 together firmly in an operating position.

Still referring to FIG. 35, loosening the clamp adjustment screw 368 allows the operator to substitute a different lower boom section 356 having a different and perhaps different style of working head on it, for example, a wire brush cutter or saw, or to rotate the lower boom section 356 relative to the upper boom section 354 so as to achieve a different angle between the operating plane of the working head and the upper boom section 354 and the engine 20. In this connection, it is conventional to rotate the lower boom section 356 90° clockwise relative to the upper boom section 354 and to locate the locating button into the associated 90° rotation locating aperture 372. Preferably, however, for the reasons detailed above, the lower boom section 356 should be rotated and then relocated with the positioning button 362 set into the 135° locking aperture 374, which is 135° clockwise from the neutral position locating aperture 366, as indicated by the 135° rotation arrow 376. For left-handed use with a straight shaft tool, the lower boom section 356 is rotated to align with the negative 1350 locating aperture 378, with its location indicated by the negative 135° rotation arrow 380.

Referring to FIG. 36, there is shown a schematic view of the lawn care apparatus 10 shown oriented in three dimensional space plotted on an xyz coordinate system. The center of trimmer string 24 in the working head 16 is at the origin of the xyz coordinate system 382 and the rotating string 24 rotates in the xy plane, that is, in the trimming position parallel to the ground. To achieve a rotating trimming string rotating in the xz plane, that is truly vertically, the lawn care apparatus must be rotated in three dimensional space and not rotated merely in a single plane, which is typically done. Rotation of such tools to date involves rotating the entire tool about the axis formed by its own drive shaft housing, i.e., in a polar coordinate fashion treating either end of the drive shaft housing as the origin. Not only does this rotation lead to an improper rotation, but it places the engine in an unsatisfactory orientation in which engine oil may find its way into the combustion chamber, as previously noted. To achieve the three dimensional rotation according to the present invention, the middle of the trimming string 24 is rotated 45° in the xy plane and simultaneously rotated 90° in the xz plane and these rotations are additive about the drive shaft housing 12, leading to a drive shaft housing rotation of 135° and a rotation of the handle 146 135° about the stem portion 180. Rotation of objects in three dimensional space is treated in Euler's rotation theorem, which has been used and adapted to work out the rotational aspects of the lawn care apparatus 10.

More particularly, hand-held power tools were originally designed to trim lawns in a two-dimensional xy plane. Then it became more practical to edge lawns with string trimmers by moving the rotating string into a vertical plane. As turf grass management has evolved, landscapers found that edging could be easily done while transporting a string trimming or brush cutting path. This discovery led to a significant reduction in the sale of safer individual power walk-behind edgers and stick edgers that are set in a two-dimensional vertical position. However, most string trimmers and brush cutters continue to be set in a two-dimensional horizontal position even though the handle is designed for trimming and edging lawns. Utilizing the combined rotational symmetry of three-dimensional power tool features corrects the two-dimensional problem.

The most commonly used definition provided for rotational symmetry was given by the mathematical physicist Herman Weyl. Weyl explains that objects are said to be symmetrical if one can subject them to a certain rotational operation and the object appears exactly the same after the rotational operation as before. Any such operation is said to be symmetrical. Objects that are turned about a fixed center to a new position so as to appear exactly the same shape must therefore possess a center line of rotational symmetry. Several objects that are on a center line of rotational symmetry are said to all possess rotational symmetry if mechanical devices are positioned anywhere on the center line of symmetry; such that devices known as gears, levers, wheels, or pulleys can adjust or transform the objects direction of rotational symmetry. A combined symmetrical transformation of several objects can be accomplished by rotating all the individual objects about a given point on the center line of rotational symmetry. Any starting point [x, y, z] of an object has symmetry if the new transformation point of an object $[x\ y\ z]=Rx(A).Ry(A).Rz(A)*[x, y, z]$. In three-dimensional space, $Rx(A)$, $Ry(A)$ and $Rz(A)$ must have a given rotation between 0° and 360°.

In summary, several objects can be rotated in symmetry about a three-dimensional xyz axes whereby the sum is equal to the xy horizontal rotation plus the xz vertical rotation. It is common to rotate objects on outdoor power tools from a particular center of rotational symmetry. However, most manufacturers do not account for the extra 1° of xy horizontal rotation for every 2° of x-z vertical rotation because there are always two planes (xy and xz) of reflection instead of the single plane (xy) encountered for trimming. Inconvenient, dangerous consequences sometimes result from limiting power tool rotational symmetry to two-dimensional space.

Any rotation can be given as a composition of rotations about three axes (Euler Rotation Theorem), and thus can be represented by a matrix operation on a vector through mathematical operations known to the art.

While the present invention has been described in accordance with the preferred embodiments thereof, the description is for illustration only and should not be construed as limiting the scope of the invention. Various changes and modifications may be made by those skilled in the art without departing from the spirit and scope of the invention as defined by the following claims. For example, a clutch or transmission may be interposed between the blower and the string trimmer; tools other than a string trimmer, such as cutting blades, saws or the like may replace the string trimmer below the blower. Therefore the invention should be measured by the claims that follow.

We claim:

1. A lawn care apparatus comprising:
   a motor;
   a clutch housing connected to said motor for conjoint movement therewith;
   a throttle grip housing having a proximal end fixedly connected to said clutch housing;
   a drive shaft housing of an elongated tubular shape having a proximal end inserted into said throttle grip housing for rotation relative to said throttle grip housing, the proximal end of said drive shaft housing being abutted against said clutch housing;
   a working head attached to a distal end of said drive shaft housing for conjoint movement therewith;
   a handle mounted to said drive shaft housing;
   a drive shaft extending through said throttle grip housing and said drive shaft housing, said drive shaft having a proximal end operatively connected to said motor and a distal end operatively connected to said working head;
   said proximal end of said drive shaft housing and said throttle grip housing operatively connected to each other by a coupling for preventing withdrawal of said drive shaft housing from said throttle grip housing while permitting rotation of said drive shaft housing relative to said throttle grip housing, whereby said drive shaft housing is rotatable to position said working head between a vertical position and a horizontal position without rotating said motor.

2. The lawn care apparatus of claim 1, wherein said coupling includes a slot through said proximal end of said drive shaft housing and about a portion of the circumference of said drive shaft housing; and wherein said throttle grip housing includes a rotation guide and limiting stop penetrating said slot.

3. The lawn care apparatus of claim 2, wherein said slot extends about 135 degrees about the circumference of said drive shaft housing.

4. The lawn care apparatus of claim 2, wherein said rotation guide and limiting stop comprises a screw threadably received by a threaded aperture formed through said throttle grip housing.

5. A lawn care apparatus comprising:
   a motor;
   a throttle grip housing having a proximal end connect to said motor for conjoint movement therewith;
   a drive shaft housing of an elongated tubular shape having a proximal end inserted into said throttle grip housing for rotation relative to said throttle grip housing;
   a working head attached to a distal end of said drive shaft housing for conjoint movement therewith;
   a handle mounted to said drive shaft housing;
   a drive shaft extending through said throttle grip housing and said drive shaft housing, said drive shaft having a proximal end operatively connected to said motor and a distal end operatively connected to said working head;
   said proximal end of said drive shaft housing and said throttle grip housing operatively connected to prevent withdrawal of said drive shaft housing from said throttle grip housing while permitting rotation of said drive shaft housing relative to said throttle grip housing, whereby said drive shaft housing is rotatable to position said working head between a vertical position and a horizontal position without rotating said motor;
   wherein said drive shaft housing includes a slot through said proximal end thereof and about a portion of the circumference of said drive shaft housing; and wherein said throttle grip housing includes a rotation guide and limiting stop penetrating said slot; and
   wherein said rotation guide and limiting stop comprises a screw threadably received by a threaded aperture formed through said throttle grip housing.

6. The lawn care apparatus of claim 5, further comprising:
   a clutch housing;
   said throttle grip housing fixedly connected at its proximal to said clutch housing; and
   said clutch housing connecting said throttle grip housing to said motor.

7. The lawn care apparatus of claim 6, wherein said clutch housing is conical shaped and includes four bosses for attaching said clutch housing to said motor.

8. The lawn care apparatus of claim 6, wherein said drive shaft housing is disposed in said throttle grip housing such that the proximal end of said drive shaft housing abuts said clutch housing.

9. The lawn care apparatus of claim 5, wherein said handle is mounted to said drive shaft housing for rotation relative to said throttle grip housing and said drive shaft housing; and wherein rotation of said handle causes said drive shaft housing to rotate relative to said throttle grip housing.

10. The lawn care apparatus of claim 5, wherein said slot extends about 135 degrees about the circumference of said drive shaft housing.

* * * * *